United States Patent
Roessle et al.

(10) Patent No.: US 9,150,077 B2
(45) Date of Patent: Oct. 6, 2015

(54) DAMPER WITH DIGITAL VALVE

(71) Applicant: Tenneco Automotive Operating Company Inc., Lake Forest, IL (US)

(72) Inventors: Matthew L. Roessle, Temperance, MI (US); Karl C. Kazmirski, Temperance, MI (US); Jeroen K. Paenhuysen, Ann Arbor, MI (US); Darrell G. Breese, Ypsilanti, MI (US); Daniel T. Keil, Temperance, MI (US); Thomas P. Mallin, Temperance, MI (US); Jeffrey T. Gardner, Woodland Park, CO (US)

(73) Assignee: Tenneco Automotive Operating Company Inc., Lake Forest, IL (US)

(*) Notice: Subject to any disclaimer, the term of this patent is extended or adjusted under 35 U.S.C. 154(b) by 0 days.

(21) Appl. No.: 14/134,390

(22) Filed: Dec. 19, 2013

(65) Prior Publication Data

US 2014/0102842 A1 Apr. 17, 2014

Related U.S. Application Data

(62) Division of application No. 12/573,911, filed on Oct. 6, 2009, now Pat. No. 8,616,351.

(51) Int. Cl.
*F16F 9/18* (2006.01)
*B60G 17/08* (2006.01)
*F16F 9/348* (2006.01)
*F16F 9/46* (2006.01)
(Continued)

(52) U.S. Cl.
CPC .............. *B60G 17/08* (2013.01); *B60G 13/02* (2013.01); *F16F 9/18* (2013.01); *F16F 9/348* (2013.01); *F16F 9/469* (2013.01); *F16F 9/50* (2013.01); *F16F 9/5126* (2013.01); *F16F 9/182* (2013.01)

(58) Field of Classification Search
CPC ............. F16F 9/182; F16F 9/50; F16F 9/348; F16F 9/469; F16F 9/5126
USPC ........... 188/282.2, 322.13, 266.5, 282.4, 313, 188/322.15
See application file for complete search history.

(56) References Cited

U.S. PATENT DOCUMENTS

| | | |
|---|---|---|
| 3,945,474 A | 3/1976 | Palmer |
| 4,552,324 A | 11/1985 | Hrusch |

(Continued)

FOREIGN PATENT DOCUMENTS

| | | |
|---|---|---|
| DE | 3928343 A1 | 2/1991 |
| DE | 19853277 C1 | 5/2000 |

(Continued)

OTHER PUBLICATIONS

International Search Report from corresponding PCT Application No. PCT/US2010/049813 dated Jun. 24, 2011.

*Primary Examiner* — Thomas Irvin
(74) *Attorney, Agent, or Firm* — Harness, Dickey & Pierce, P.L.C.

(57) ABSTRACT

A shock absorber has a compression valve assembly that provides a high damping load during a compression stroke and an extension valve assembly that provides a high damping load during an extension stroke. One or more digital valve assemblies is positioned to work in parallel with the compression valve assembly and the extension valve assembly to provide a lower damping load. The lowering of the damping load is based upon the cross sectional area of flow passages provided by the one or more digital valve assemblies.

9 Claims, 18 Drawing Sheets

(51) Int. Cl.
  *F16F 9/512* (2006.01)
  *B60G 13/02* (2006.01)
  *F16F 9/50* (2006.01)

(56) References Cited

U.S. PATENT DOCUMENTS

| | | | |
|---|---|---|---|
| 4,589,528 A | 5/1986 | Axthammer et al. |
| 4,749,070 A | 6/1988 | Moser et al. |
| 4,788,489 A | 11/1988 | Kobayashi et al. |
| 4,846,317 A | 7/1989 | Hudgens |
| 4,850,460 A | 7/1989 | Knecht et al. |
| 4,867,476 A | 9/1989 | Yamanaka et al. |
| 4,872,537 A | 10/1989 | Warner |
| 4,892,328 A | 1/1990 | Kurtzman et al. |
| 4,909,536 A | 3/1990 | Hale |
| 4,958,706 A | 9/1990 | Richardson et al. |
| 4,969,662 A | 11/1990 | Stuart |
| 4,973,854 A | 11/1990 | Hummel |
| 4,986,393 A | 1/1991 | Preukschat et al. |
| 5,038,613 A | 8/1991 | Takenaka et al. |
| 5,133,434 A | 7/1992 | Kikushima et al. |
| 5,143,185 A | 9/1992 | Klein et al. |
| 5,154,442 A | 10/1992 | Milliken |
| 5,189,614 A | 2/1993 | Mitsuoka et al. |
| 5,200,895 A | 4/1993 | Emura et al. |
| 5,293,968 A | 3/1994 | Schuelke et al. |
| 5,299,488 A | 4/1994 | Kadlicko et al. |
| 5,350,187 A | 9/1994 | Shinozaki |
| 5,350,983 A | 9/1994 | Miller et al. |
| 5,360,089 A | 11/1994 | Nakamura et al. |
| 5,363,945 A | 11/1994 | Lizell et al. |
| 5,383,679 A | 1/1995 | Nakamura et al. |
| 5,396,973 A | 3/1995 | Schwemmer et al. |
| 5,404,973 A | 4/1995 | Katoh et al. |
| 5,487,455 A | 1/1996 | Feigel |
| 5,497,862 A | 3/1996 | Hoya |
| 5,570,762 A | 11/1996 | Jentsch et al. |
| 5,597,054 A | 1/1997 | Nagai et al. |
| 5,653,315 A | 8/1997 | Ekquist et al. |
| 5,655,633 A | 8/1997 | Nakadate et al. |
| 5,690,195 A | 11/1997 | Kruckemeyer et al. |
| 5,775,470 A | 7/1998 | Feigel |
| 5,803,482 A | 9/1998 | Kim |
| 5,833,036 A | 11/1998 | Gillespie |
| 5,860,497 A | 1/1999 | Takahashi |
| 5,878,851 A | 3/1999 | Carlson et al. |
| 5,913,391 A | 6/1999 | Jeffries et al. |
| 5,937,976 A | 8/1999 | Grundei |
| 5,950,775 A | 9/1999 | Achmad |
| 5,967,268 A | 10/1999 | de Molina et al. |
| 6,003,644 A | 12/1999 | Tanaka |
| 6,036,500 A | 3/2000 | Francis et al. |
| 6,109,400 A | 8/2000 | Ayyildiz et al. |
| 6,155,391 A | 12/2000 | Kashiwagi et al. |
| 6,213,262 B1 | 4/2001 | Bell |
| 6,296,091 B1 | 10/2001 | Hamilton |
| 6,302,248 B1 | 10/2001 | Nakadate |
| 6,321,888 B1 | 11/2001 | Reybrouck et al. |
| 6,343,677 B2 | 2/2002 | Bell |
| 6,427,986 B1 | 8/2002 | Sakai et al. |
| 6,460,664 B1 | 10/2002 | Steed et al. |
| 6,474,454 B2 * | 11/2002 | Matsumoto et al. ....... 188/282.6 |
| 6,588,726 B2 | 7/2003 | Osterhart et al. |
| 6,616,124 B2 | 9/2003 | Oliver et al. |
| 6,651,787 B2 | 11/2003 | Grundei |
| 6,655,512 B2 | 12/2003 | Moradmand et al. |
| 6,668,986 B2 * | 12/2003 | Moradmand et al. ......... 188/267 |
| 6,672,436 B1 | 1/2004 | Keil et al. |
| 6,708,803 B2 | 3/2004 | Jensen |
| 6,782,980 B2 * | 8/2004 | Nakadate ...................... 188/313 |
| 6,814,193 B2 | 11/2004 | Grundei |
| 6,817,454 B2 * | 11/2004 | Nezu et al. ................. 188/282.2 |
| 6,851,528 B2 | 2/2005 | Lemieux |
| 6,959,797 B2 | 11/2005 | Mintgen et al. |
| 6,964,325 B2 | 11/2005 | Maes |
| 6,978,872 B2 | 12/2005 | Turner |
| 7,032,912 B2 | 4/2006 | Nicot et al. |
| 7,156,214 B2 * | 1/2007 | Pradel et al. ............... 188/319.1 |
| 7,234,574 B2 | 6/2007 | Matsunaga et al. |
| 7,234,707 B2 | 6/2007 | Green et al. |
| 7,273,138 B2 | 9/2007 | Park |
| 7,347,307 B2 | 3/2008 | Joly |
| 7,374,028 B2 | 5/2008 | Fox |
| 7,413,062 B2 | 8/2008 | Vandewal |
| 7,475,538 B2 | 1/2009 | Bishop |
| 7,493,995 B2 | 2/2009 | Sas et al. |
| 7,604,101 B2 | 10/2009 | Park |
| 7,611,000 B2 | 11/2009 | Naito |
| 7,628,253 B2 | 12/2009 | Jin et al. |
| 7,654,369 B2 | 2/2010 | Murray et al. |
| 7,654,370 B2 | 2/2010 | Cubalchini, Jr. |
| 7,722,405 B2 | 5/2010 | Jaklin et al. |
| 7,770,983 B2 | 8/2010 | Park |
| 7,775,333 B2 | 8/2010 | Or et al. |
| 7,849,983 B2 | 12/2010 | St. Clair et al. |
| 7,878,311 B2 | 2/2011 | Van Weelden et al. |
| 7,896,311 B2 | 3/2011 | Jee |
| 7,926,513 B2 | 4/2011 | Ishibashi et al. |
| 7,942,248 B2 | 5/2011 | St. Clair et al. |
| 7,946,399 B2 | 5/2011 | Masamura |
| 7,967,116 B2 | 6/2011 | Boerschig |
| 7,967,117 B2 | 6/2011 | Abe |
| 7,992,692 B2 | 8/2011 | Lee et al. |
| 7,997,394 B2 | 8/2011 | Yamaguchi |
| 8,056,392 B2 | 11/2011 | Ryan et al. |
| 8,132,654 B2 | 3/2012 | Widla et al. |
| 8,136,644 B2 | 3/2012 | Sonsterod |
| 8,160,774 B2 | 4/2012 | Li et al. |
| 8,267,382 B2 | 9/2012 | Yazaki et al. |
| 8,393,446 B2 | 3/2013 | Haugen |
| 8,430,217 B2 | 4/2013 | Hennecke et al. |
| 8,616,351 B2 | 12/2013 | Roessle et al. |
| 8,685,367 B2 | 4/2014 | Brandom et al. |
| 8,695,766 B2 | 4/2014 | Yamashita et al. |
| 8,794,405 B2 | 8/2014 | Yamashita et al. |
| 8,844,687 B2 | 9/2014 | Yu et al. |
| 2002/0133277 A1 | 9/2002 | Koh |
| 2003/0164193 A1 | 9/2003 | Lou |
| 2003/0192755 A1 | 10/2003 | Barbison et al. |
| 2004/0090020 A1 | 5/2004 | Braswell |
| 2005/0029063 A1 | 2/2005 | Neumann |
| 2005/0056502 A1 | 3/2005 | Maes |
| 2006/0038149 A1 | 2/2006 | Albert et al. |
| 2006/0124415 A1 | 6/2006 | Joly |
| 2006/0219503 A1 | 10/2006 | Kim |
| 2007/0034466 A1 | 2/2007 | Paesmans et al. |
| 2007/0051574 A1 | 3/2007 | Keil et al. |
| 2008/0054537 A1 | 3/2008 | Harrison |
| 2008/0250844 A1 | 10/2008 | Gartner |
| 2008/0277218 A1 | 11/2008 | Fox |
| 2009/0078517 A1 | 3/2009 | Maneyama et al. |
| 2009/0084647 A1 | 4/2009 | Maneyama et al. |
| 2009/0132122 A1 | 5/2009 | Kim et al. |
| 2009/0192673 A1 | 7/2009 | Song et al. |
| 2010/0001217 A1 | 1/2010 | Jee et al. |
| 2010/0044172 A1 | 2/2010 | Jee et al. |
| 2010/0066051 A1 | 3/2010 | Haugen |
| 2010/0163354 A1 | 7/2010 | Braun |
| 2010/0181154 A1 | 7/2010 | Panichgasem |
| 2010/0191420 A1 | 7/2010 | Honma et al. |
| 2010/0211253 A1 | 8/2010 | Morais Dos Santos et al. |
| 2011/0035091 A1 | 2/2011 | Yamamoto |
| 2011/0056783 A1 | 3/2011 | Teraoka et al. |
| 2011/0079475 A1 | 4/2011 | Roessle et al. |
| 2011/0101579 A1 | 5/2011 | Polakowski et al. |
| 2011/0198172 A1 | 8/2011 | Whan |
| 2011/0240424 A1 | 10/2011 | Beck |
| 2011/0298399 A1 | 12/2011 | Ogawa et al. |
| 2012/0048665 A1 | 3/2012 | Marking |
| 2012/0181126 A1 | 7/2012 | de Kock |
| 2013/0234379 A1 | 9/2013 | Panichgasem |
| 2013/0313057 A1 | 11/2013 | Tsukahara et al. |
| 2013/0340865 A1 | 12/2013 | Manger et al. |
| 2013/0341842 A1 | 12/2013 | Weber |

(56) References Cited

U.S. PATENT DOCUMENTS

FOREIGN PATENT DOCUMENTS

| | | |
|---|---|---|
| DE | 10238657 A1 | 3/2004 |
| EP | 1588072 A1 | 10/2005 |
| EP | 1746302 A1 | 1/2007 |
| GB | 2 123 922 | 2/1984 |
| JP | 61125907 | 6/1986 |
| JP | 62-253506 | 11/1987 |
| JP | 06-026546 | 2/1994 |
| JP | 07-113434 | 5/1995 |
| JP | 7056311 | 6/1995 |
| JP | 08-260747 | 10/1996 |
| JP | 09-217779 | 8/1997 |
| JP | 2002-349630 A | 12/2002 |
| WO | 9218788 A1 | 10/1992 |

\* cited by examiner

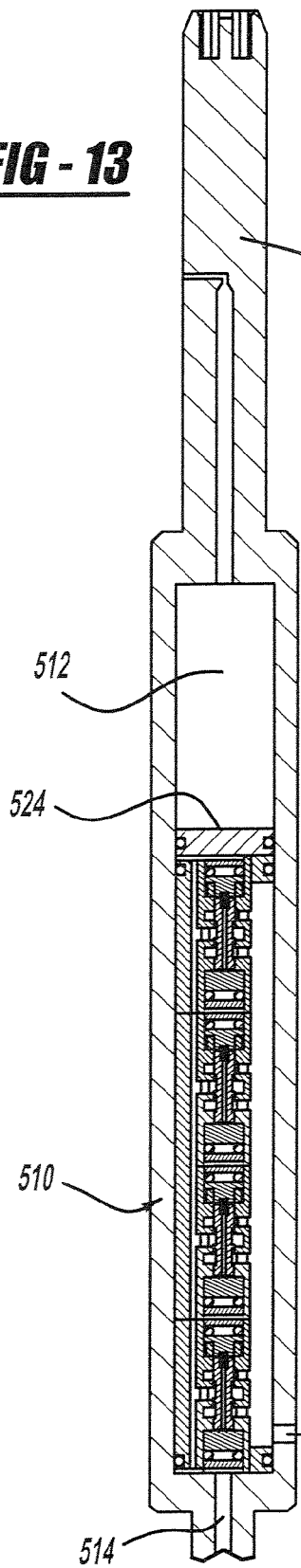
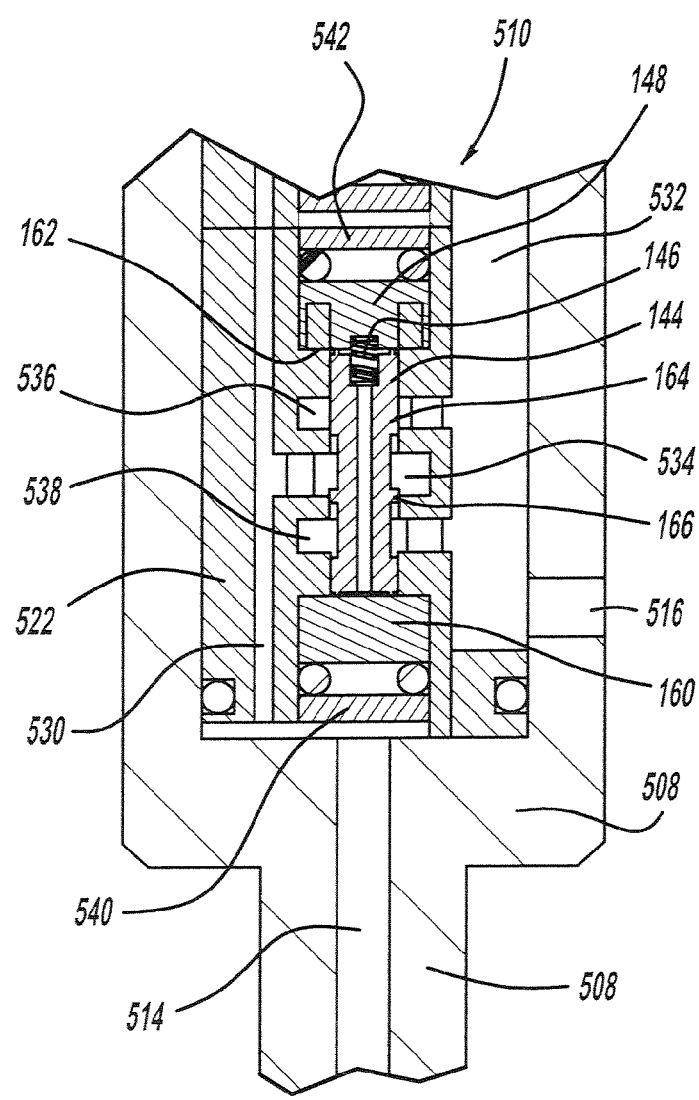
FIG - 13
FIG - 14

DAMPER WITH DIGITAL VALVE

CROSS-REFERENCE TO RELATED APPLICATIONS

This application is a divisional of U.S. patent application Ser. No. 12/573,911 filed on Oct. 6, 2009. The entire disclosure of the above application is incorporated herein by reference.

FIELD

The present disclosure relates generally to hydraulic dampers or shock absorbers for use in a suspension system such as a suspension system used for automotive vehicles. More particularly, the present disclosure relates to a digital damper valve which is combined with the conventional passive valve systems to determine the damping characteristics of the hydraulic damper.

BACKGROUND

This section provides background information related to the present disclosure which is not necessarily prior art.

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile. A piston is located within a pressure tube of the shock absorber and the pressure tube is connected to the unsprung portion of the vehicle. The piston is connected to the sprung portion of the automobile through a piston rod which extends through the pressure tube. The piston divides the pressure tube into an upper working chamber and a lower working chamber both of which are filled with hydraulic fluid. Because the piston is able, through valving, to limit the flow of the hydraulic fluid between the upper and the lower working chambers when the shock absorber is compressed or extended, the shock absorber is able to produce a damping force which counteracts the vibration which would otherwise be transmitted from the unsprung portion to the sprung portion of the vehicle. In a dual-tube shock absorber, a fluid reservoir or reserve chamber is defined between the pressure tube and a reserve tube. A base valve is located between the lower working chamber and the reserve chamber to also produce a damping force which counteracts the vibrations which would otherwise be transmitted from the unsprung portion of the vehicle to the sprung portion of the automobile.

As described above, for a dual-tube shock absorber, the valving on the piston limits the flow of damping fluid between the upper and lower working chambers when the shock absorber is extended to produce a damping load. The valving on the base valve limits the flow of damping fluid between the lower working chamber and the reserve chamber when the shock absorber is compressed to produce a damping load. For a mono-tube shock absorber, the valving on the piston limits the flow of damping fluid between the upper and lower working chambers when the shock absorber is extended or compressed to produce a damping load. During driving, the suspension system moves in jounce (compression) and rebound (extension). During jounce movements, the shock absorber is compressed causing damping fluid to move through the base valve in a dual-tube shock absorber or through the piston valve in a mono-tube shock absorber. A damping valve located on the base valve or the piston controls the flow of damping fluid and thus the damping force created. During rebound movements, the shock absorber is extended causing damping fluid to move through the piston in both the dual-tube shock absorber and the mono-tube shock absorber. A damping valve located on the piston controls the flow of damping fluid and thus the damping force created.

In a dual-tube shock absorber, the piston and the base valve normally include a plurality of compression passages and a plurality of extension passages. During jounce or compression movements in a dual-tube shock absorber, the damping valve or the base valve opens the compression passages in the base valve to control fluid flow and produce a damping load. A check valve on the piston opens the compression passages in the piston to replace damping fluid in the upper working chamber but this check valve does not contribute to the damping load. The damping valve on the piston closes the extension passages of the piston and a check valve on the base valve closes the extension passages of the base valve during a compression movement. During rebound or extension movements in a dual-tube shock absorber, the damping valve on the piston opens the extension passages in the piston to control fluid flow and produce a damping load. A check valve on the base valve opens the extension passages in the base valve to replace damping fluid in the lower working chamber but this check valve does not contribute to the damping load.

In a mono-tube shock absorber, the piston normally includes a plurality of compression passages and a plurality of extension passages. The shock absorber will also include means for compensating for the rod volume flow of fluid as is well known in the art. During jounce or compression movements in a mono-tube shock absorber, the compression damping valve on the piston opens the compression passages in the piston to control fluid flow and produce a damping load. The extension damping valve on the piston closes the extension passages of the piston during a jounce movement. During rebound or extension movements in a mono-tube shock absorber, the extension damping valve on the piston opens the extension passages in the piston to control fluid flow and produce a damping load. The compression damping valve on the piston closes the compression passages of the piston during a rebound movement.

For most dampers, the damping valves are designed as a normal close/open valve even though some valves may include a bleed flow of damping fluid. Because of this close/open design, these passive valve systems are limited in their ability to adjust the generated damping load in response to various operating conditions of the vehicle.

SUMMARY

This section provides a general summary of the disclosure, and is not a comprehensive disclosure of its full scope or all of its features.

A valve assembly for a shock absorber includes a digital valve assembly which is used in conjunction with the typical passive valve assembly. When the digital valve assembly is closed, a firm or high damping load is generated. Softer or lower damping loads are achieved through various combinations of the digital valve assembly working in conjunction with the passive valve assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 13 is an enlarged cross-sectional view of a piston rod assembly in accordance with another embodiment of the present disclosure;

FIG. 14 is an enlarged cross-sectional view of the digital valve assembly illustrated in FIG. 13;

Corresponding reference numerals indicate corresponding parts throughout the several views of the drawings.

DETAILED DESCRIPTION

Figure 1:
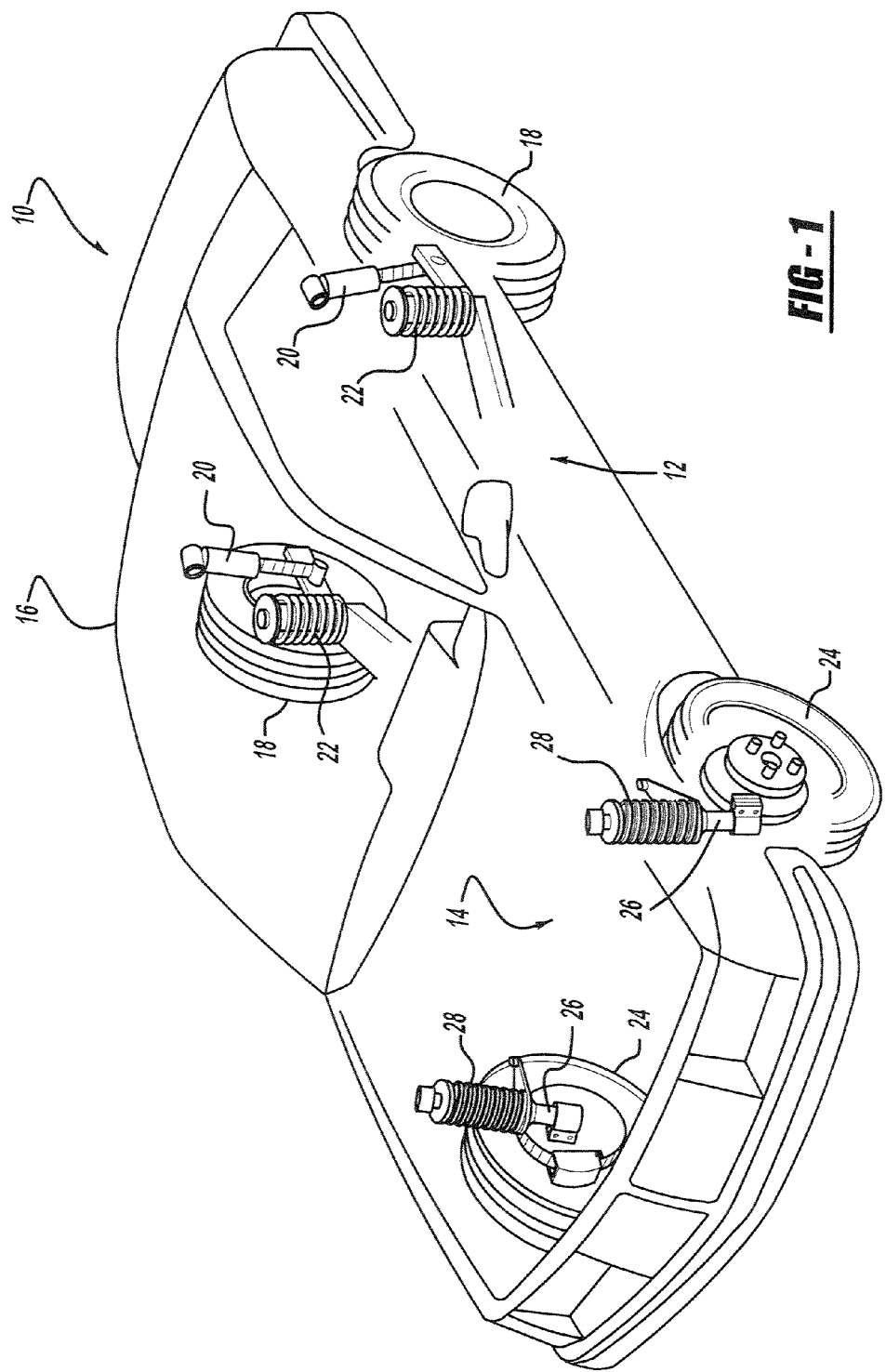
FIG. 1 is an illustration of an automobile having shock absorbers which incorporate the valve design in accordance with the present disclosure.

The following description is merely exemplary in nature and is not intended to limit the present disclosure, application, or uses. There is shown in FIG. 1 a vehicle incorporating a suspension system having shock absorbers, each of which incorporates a valve assembly in accordance with the present invention, and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of shock absorbers 20 and by a pair of springs 22. Similarly, front suspension 14 includes a transversely extending front axle assembly (not shown) to operatively support a pair of front wheels 24. The front axle assembly is attached to body 16 by means of a pair of shock absorbers 26 and by a pair of springs 28. Shock absorbers 20 and 26 serve to dampen the relative motion of the unsprung portion (i.e., front and rear suspensions 12, 14) with respect to the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Figure 2:
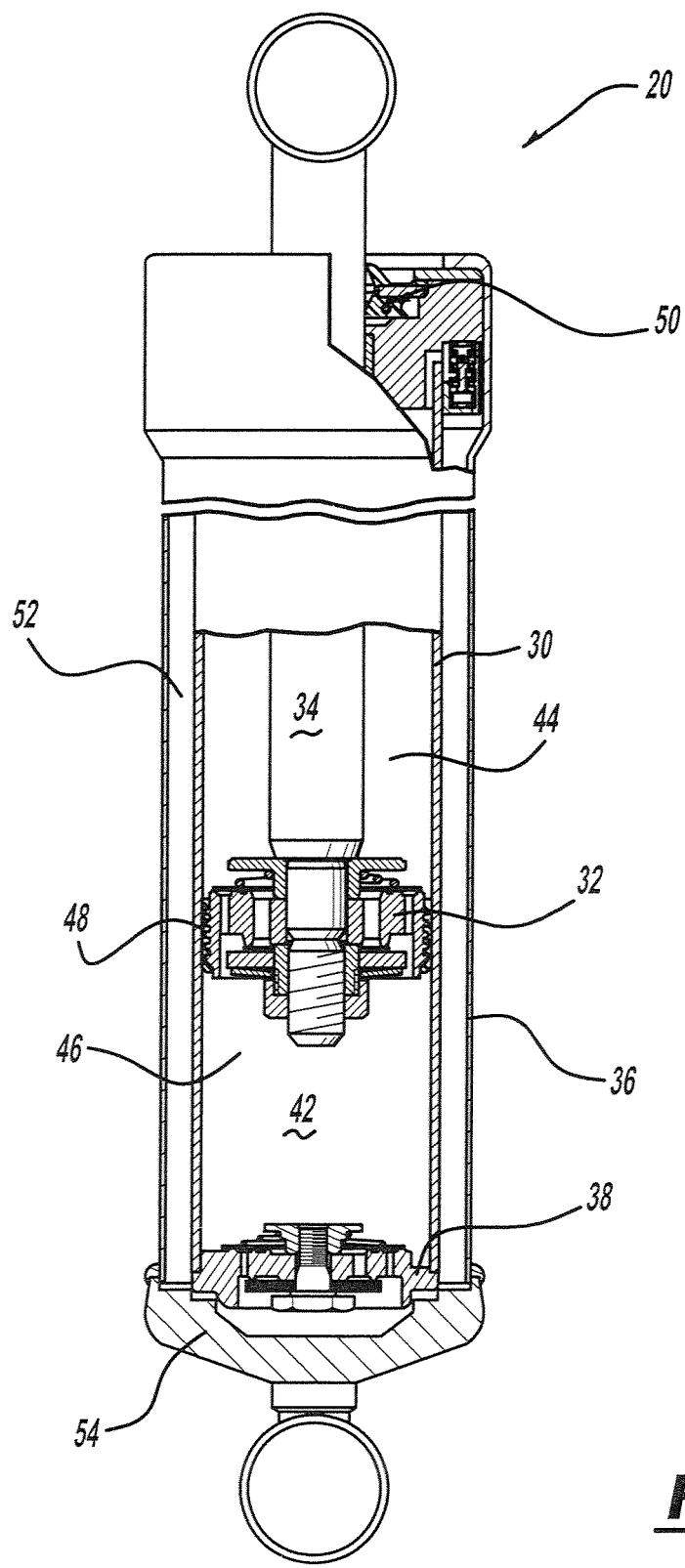
FIG. 2 is a side view, partially in cross-section of a dual-tube shock absorber from FIG. 1 which incorporates the valve design in accordance with the present disclosure.

Referring now to FIG. 2, shock absorber 20 is shown in greater detail. While FIG. 2 illustrates only shock absorber 20, it is to be understood that shock absorber 26 also includes the valve assembly design described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reserve tube 36 and a base valve assembly 38.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through a rod guide assembly 50 which closes the upper end of pressure tube 30. The end of piston rod 34 opposite to piston assembly 32 is adapted to be secured to the sprung mass of vehicle 10. Valving within piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced is known as the "rod volume" and it flows through base valve assembly 38.

Reserve tube 36 surrounds pressure tube 30 to define a fluid reservoir chamber 52 located between tubes 30 and 36. The bottom end of reserve tube 36 is closed by a base cup 54 which is adapted to be connected to the unsprung mass of vehicle 10. The upper end of reserve tube 36 is attached to rod guide assembly 50. Base valve assembly 38 is disposed between lower working chamber 46 and reservoir chamber 52 to control the flow of fluid between chambers 46 and 52. When shock absorber 20 extends in length, an additional volume of fluid is needed in lower working chamber 46 due to the "rod volume" concept. Thus, fluid will flow from reservoir chamber 52 to lower working chamber 46 through base valve assembly 38 as detailed below. When shock absorber 20 compresses in length, an excess of fluid must be removed from lower working chamber 46 due to the "rod volume" concept. Thus, fluid will flow from lower working chamber 46 to reservoir chamber 52 through base valve assembly 38 as detailed below.

Figure 3:
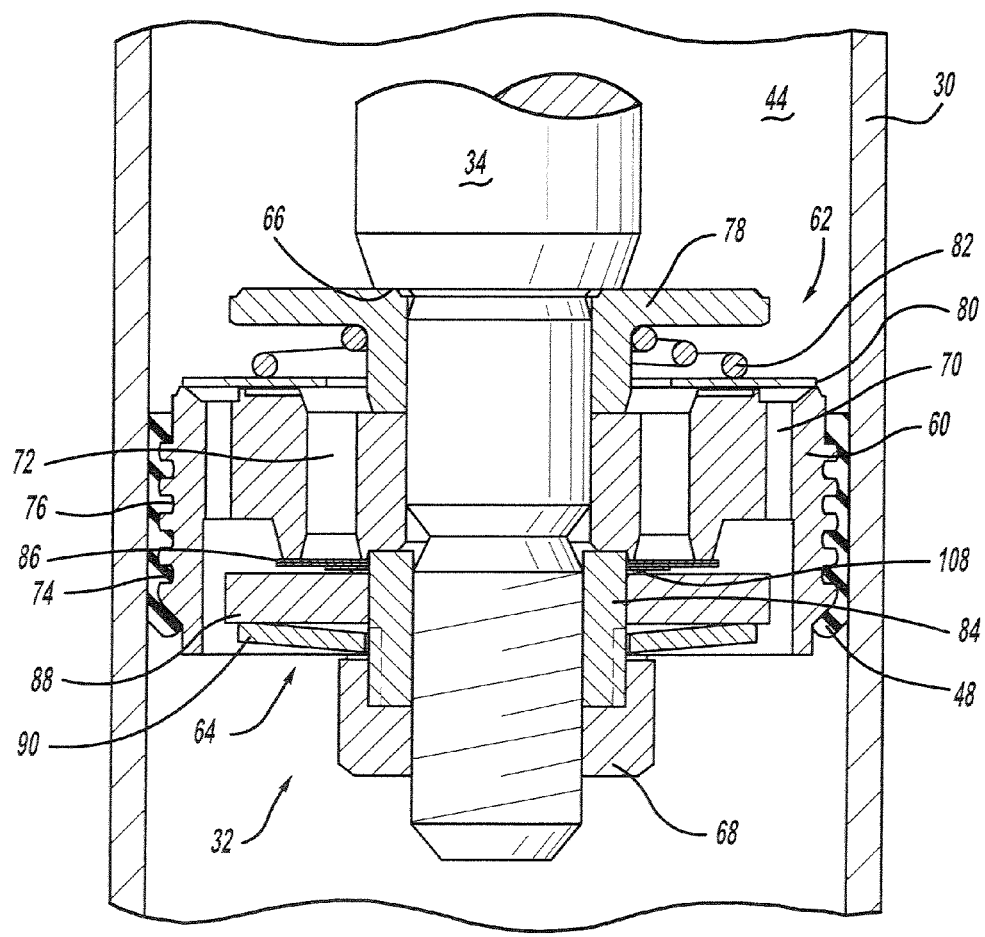
FIG. 3 is an enlarged side view, partially in cross-section, of the piston assembly from the shock absorber illustrated in FIG. 2.

Referring now to FIG. 3, piston assembly 32 comprises a piston body 60, a compression valve assembly 62 and a rebound valve assembly 64. Compression valve assembly 62 is assembled against a shoulder 66 on piston rod 34. Piston body 60 is assembled against compression valve assembly 62 and rebound valve assembly 64 is assembled against piston body 60. A nut 68 secures these components to piston rod 34.

Piston body 60 defines a plurality of compression passages 70 and a plurality of rebound passages 72. Seal 48 includes a plurality of ribs 74 which mate with a plurality of annular grooves 76 to retain seal 48 during sliding movement of piston assembly 32.

Compression valve assembly 62 comprises a retainer 78, a valve disc 80 and a spring 82. Retainer 78 abuts shoulder 66 on one end and piston body 60 on the other end. Valve disc 80 abuts piston body 60 and closes compression passages 70 while leaving rebound passages 72 open. Spring 82 is disposed between retainer 78 and valve disc 80 to bias valve disc 80 against piston body 60. During a compression stroke, fluid in lower working chamber 46 is pressurized causing fluid pressure to react against valve disc 80. When the fluid pressure against valve disc 80 overcomes the biasing load of spring 82, valve disc 80 separates from piston body 60 to open compression passages 70 and allow fluid flow from lower working chamber 46 to upper working chamber 44. Typically spring 82 only exerts a light load on valve disc 80 and compression valve assembly 62 acts as a check valve between chambers 46 and 44. The damping characteristics for shock absorber 20 during a compression stroke are controlled in part by base valve assembly 38 which accommodates the flow of fluid from lower working chamber 46 to reservoir chamber 52 due to the "rod volume" concept. During a rebound stroke, compression passages 70 are closed by valve disc 80.

Rebound valve assembly 64 is termed a passive valve assembly which comprises a spacer 84, a plurality of valve discs 86, a retainer 88 and a spring 90. Spacer 84 is threadingly received on piston rod 34 and is disposed between piston body 60 and nut 68. Spacer 84 retains piston body 60 and compression valve assembly 62 while permitting the tightening of nut 68 without compressing either valve disc 80 or valve discs 86. Retainer 78, piston body 60 and spacer 84 provide a continuous solid connection between shoulder 66 and nut 68 to facilitate the tightening and securing of nut 68 to spacer 84 and thus to piston rod 34. Valve discs 86 are slidingly received on spacer 84 and abut piston body 60 to close rebound passages 72 while leaving compression passages 70 open. Retainer 88 is also slidingly received on spacer 84 and it abuts valve discs 86. Spring 90 is assembled over spacer 84 and is disposed between retainer 88 and nut 68 which is threadingly received on spacer 84. Spring 90 biases retainer 88 against valve discs 86 and valve discs 86 against piston body 60. When fluid pressure is applied to valve discs 86, they will elastically deflect at the outer peripheral edge to open rebound valve assembly 64. A shim is located between nut 68 and spring 90 to control the preload for spring 90 and thus the blow off pressure as described below. Thus, the calibration for the blow off feature of rebound valve assembly 64 is separate from the calibration for compression valve assembly 62.

During a rebound stroke, fluid in upper working chamber 44 is pressurized causing fluid pressure to react against valve discs 86. Prior to the deflecting of valve discs 86, a bleed flow of fluid flows through a bleed passage defined between valve discs 86 and piston body 60. When the fluid pressure reacting against valve discs 86 overcomes the bending load for valve discs 86, valve discs 86 elastically deflect opening rebound passages 72 allowing fluid flow from upper working chamber 44 to lower working chamber 46. The strength of valve discs 86 and the size of rebound passages will determine the damping characteristics for shock absorber 20 in rebound. When the fluid pressure within upper working chamber 44 reaches a predetermined level, the fluid pressure will overcome the biasing load of spring 90 causing axial movement of retainer 88 and the plurality of valve discs 86. The axial movement of retainer 88 and valve discs 86 fully opens rebound passages 72 thus allowing the passage of a significant amount of damping fluid creating a blowing off of the fluid pressure which is required to prevent damage to shock absorber 20 and/or vehicle 10.

Figure 4:
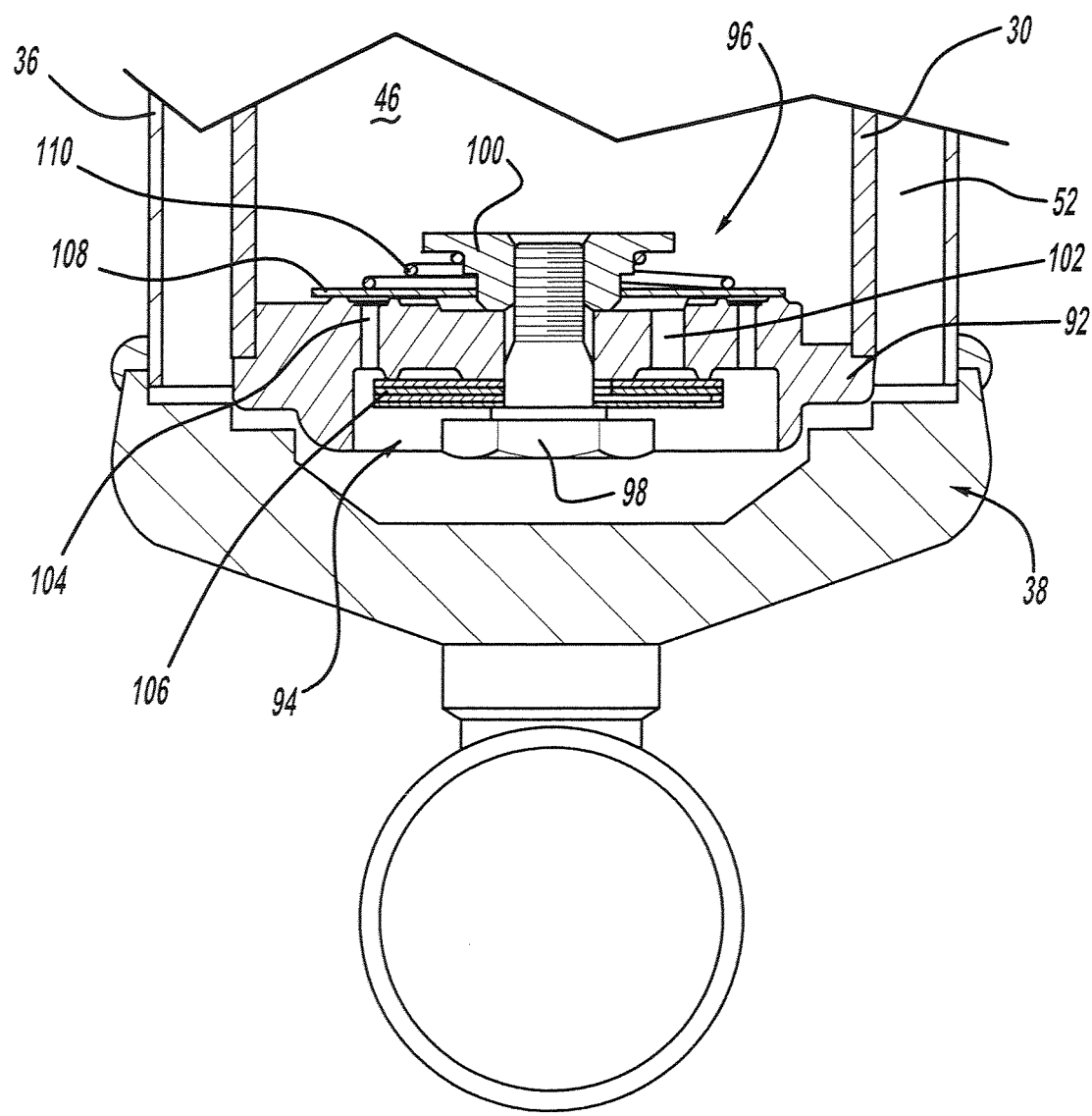
FIG. 4 is an enlarged side view, partially in cross-section of the base valve assembly from the shock absorber illustrated in FIG. 2.

Referring to FIG. 4, base valve assembly 38 comprises a valve body 92, a compression valve assembly 94 and a rebound valve assembly 96. Compression valve assembly 94 and rebound valve assembly 96 are attached to valve body 92 using a bolt 98 and a nut 100. The tightening of nut 100 biases compression valve assembly 94 towards valve body 92. Valve body 92 defines a plurality of compression passages 102 and a plurality of rebound passages 104.

Compression valve assembly 94 is termed a passive valve assembly which comprises a plurality of valve discs 106 that are biased against valve body 92 by bolt 98 and nut 100. During a compression stroke, fluid in lower working chamber 46 is pressurized and the fluid pressure within compression passages 102 reacts against valve discs 106. Prior to the deflection of valve discs 106, a bleed flow of fluid will flow through a bleed passage defined between valve discs 106 and valve body 92. The fluid pressure reacting against valve discs 106 will eventually open compression valve assembly 94 by deflecting valve discs 106 in a manner similar to that described above for rebound valve assembly 64. Compression valve assembly 62 will allow fluid flow from lower working chamber 46 to upper working chamber 44 and only the "rod volume" will flow through compression valve assembly 94. The damping characteristics for shock absorber 20 are determined in part by the design of compression valve assembly 94 of base valve assembly 38.

Rebound valve assembly 96 comprises a valve disc 108 and a valve spring 110. Valve disc 108 abuts valve body 92 and closes rebound passages 104. Valve spring 110 is disposed between nut 100 and valve disc 80 to bias valve disc 108 against valve body 92. During a rebound stroke, fluid in lower working chamber 46 is reduced in pressure causing fluid pressure in reservoir chamber 52 to react against valve disc 108. When the fluid pressure against valve disc 108 overcomes the biasing load of valve spring 110, valve disc 108 separates from valve body 92 to open rebound passages 104 and allow fluid flow from reservoir chamber 52 to lower working chamber 46. Typically valve spring 110 exerts only a light load on valve disc 108 and compression valve assembly 94 acts as a check valve between reservoir chamber 52 and lower working chamber 46. The damping characteristics for a rebound stroke are controlled in part by rebound valve assembly 64 as detailed above.

Figure 5:
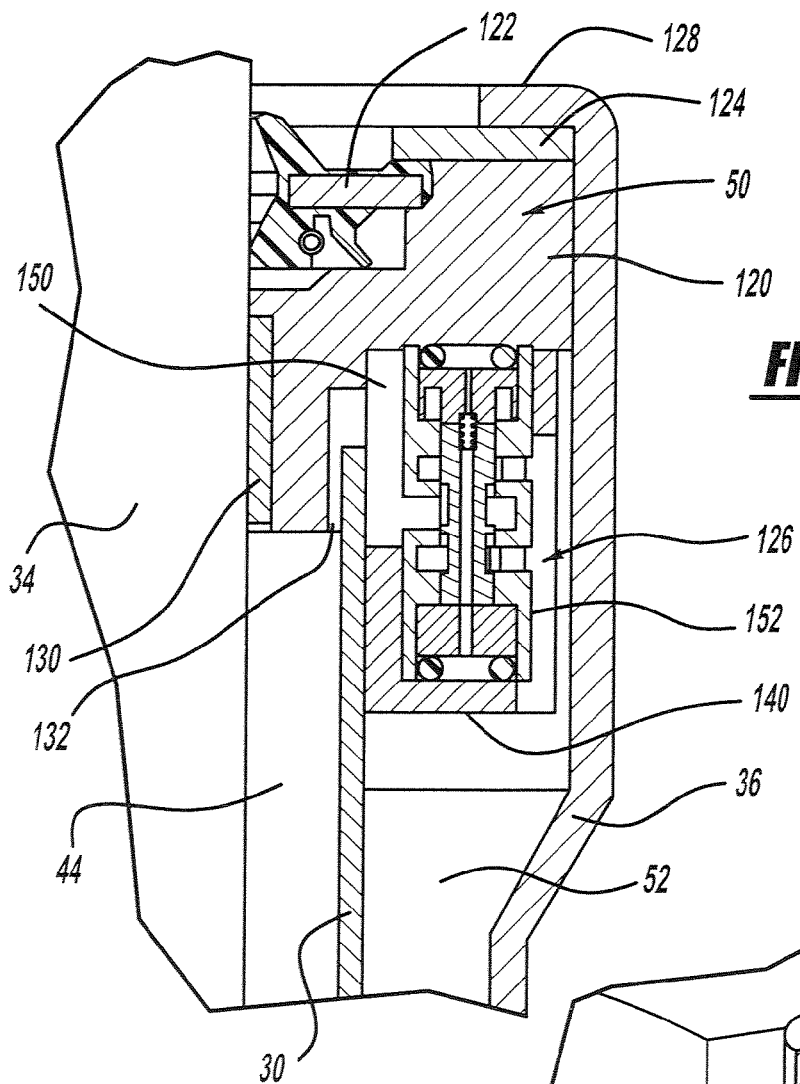
FIG. 5 is an enlarged side view, partially in cross-section of the digital valve assembly from the shock absorber illustrated in FIG. 2.
Figure 6:
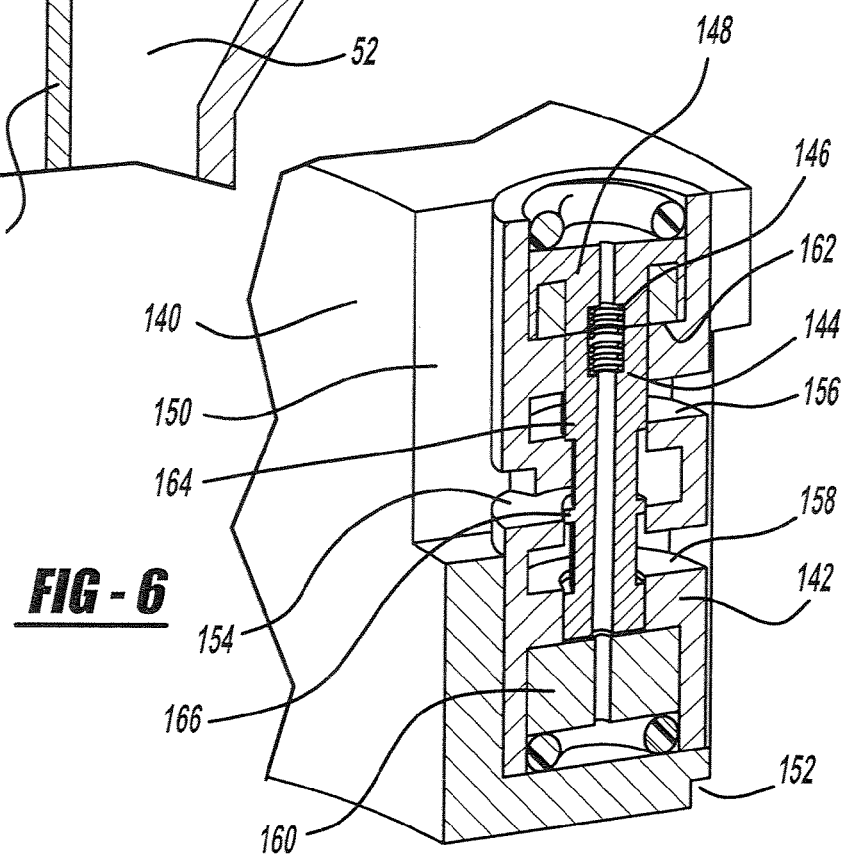
FIG. 6 is an enlarged cross-sectional perspective view of the digital valve assembly illustrated in FIGS. 2 and 5.

Referring now to FIGS. 5 and 6, rod guide assembly 50 is illustrated in greater detail. Rod guide assembly 50 comprises a rod guide housing 120, a seal assembly 122, a retainer 124 and a digital valve assembly 126.

Rod guide housing 120 is assembled into pressure tube 30 and into reserve tube 36. Seal assembly 122 and retainer 124 are assembled to rod guide housing 120 and reserve tube 36 is rolled or formed over as illustrated at 128 to retain rod guide assembly 50. A bushing 130 assembled into rod guide housing 120 accommodates for the sliding motion of piston rod 34 while also providing for a seal for piston rod 34. A fluid passage 132 extends through rod guide housing 120 to allow fluid communication between upper working chamber 44 and digital valve assembly 126 as discussed below.

Digital valve assembly 126 is a two position valve assembly which has a different flow area in each of the two positions. Digital valve assembly 126 comprises a valve housing 140, a sleeve 142, a spool 144, a spring 146 and a coil assembly 148. Valve housing 140 defines a valve inlet 150 which is in communication with upper working chamber 44 through fluid passage 132 and a valve outlet 152 which is in fluid communication with reservoir chamber 52. While this embodiment and other embodiments described later include spring 146 in the digital valve assemblies, it is within the scope of the present disclosure to use digital valve assemblies that do not include spring 146. Digital valve assemblies that do not include spring 146 are moved between their two positions by reversing the current or reversing the polarity of the power provided to the digital valve assembly.

Sleeve 142 is disposed within valve housing 140. Sleeve 142 defines an annular inlet chamber 154 which is in communication with valve inlet 150 and a pair of annular outlet chambers 156 and 158 which are in communication with valve outlet 152.

Spool 144 is slidingly received within sleeve 142 and axially travels within sleeve 142 between coil assembly 148 and a stop puck 160 disposed within sleeve 142. Spring 146 biases spool 144 away from coil assembly 148 and towards stop puck 160. A shim 162 is disposed between coil assembly 148 and sleeve 142 to control the amount of axial motion for spool 144. A first O-ring seals the interface between stop puck 160, sleeve 142 and valve housing 140. A second O-ring seals the interface between coil assembly 148, sleeve 142 and rod guide housing 120.

Spool 144 defines a first flange 164 which controls fluid flow between annular inlet chamber 154 and annular outlet chamber 156 and a second flange 166 that controls fluid flow between annular inlet chamber 154 and annular outlet chamber 158. Flanges 164 and 166 thus control fluid flow from upper working chamber 44 to reservoir chamber 52.

Coil assembly 148 is disposed within sleeve 142 to control the axial movement of spool 144. The wiring connections for coil assembly 148 can extend through rod guide housing 120, through sleeve 142, through valve housing 140 and/or through reserve tube 36. When there is no power provided to coil assembly 148, the damping characteristics will be defined by the flow area of digital valve assembly 126 in its first position, piston assembly 32 and base valve assembly 38. The movement of spool 144 is controlled by supplying power to coil assembly 148 to move digital valve assembly to its second position. Digital valve assembly 126 can be kept in its second position by continuing to supply power to coil assembly 148 or by providing means for retaining digital valve assembly 126 in its second position and discontinuing the supply of power to coil assembly 148. The means for retaining digital valve assembly 126 in its second position can include mechanical means, magnetic means or other means known in the art. Once in its second position, movement to the first position can be accomplished by terminating power to coil assembly 148 or by reversing the current or reversing the polarity of the power supplied to coil assembly 148 to overcome the retaining means. The amount of flow through digital valve assembly 126 has discrete settings for flow control in both the first position and the second position. While the present disclosure is described using only one digital valve assembly 126, it is within the scope of the disclosure to use a plurality of digital valve assemblies 126. When multiple digital valve assemblies 126 are used, the total flow area through the plurality of digital valve assemblies 126 can be set at a specific number of total flow areas depending on the position of each individual digital valve assemblies 126. The specific number of total flow areas can be defined as being $2^n$ flow areas where n is the number of digital valve assemblies 126. For example, if four digital valve assemblies 126, the number of total flow areas available would be $2^4$ or sixteen flow areas.

Figure 7:
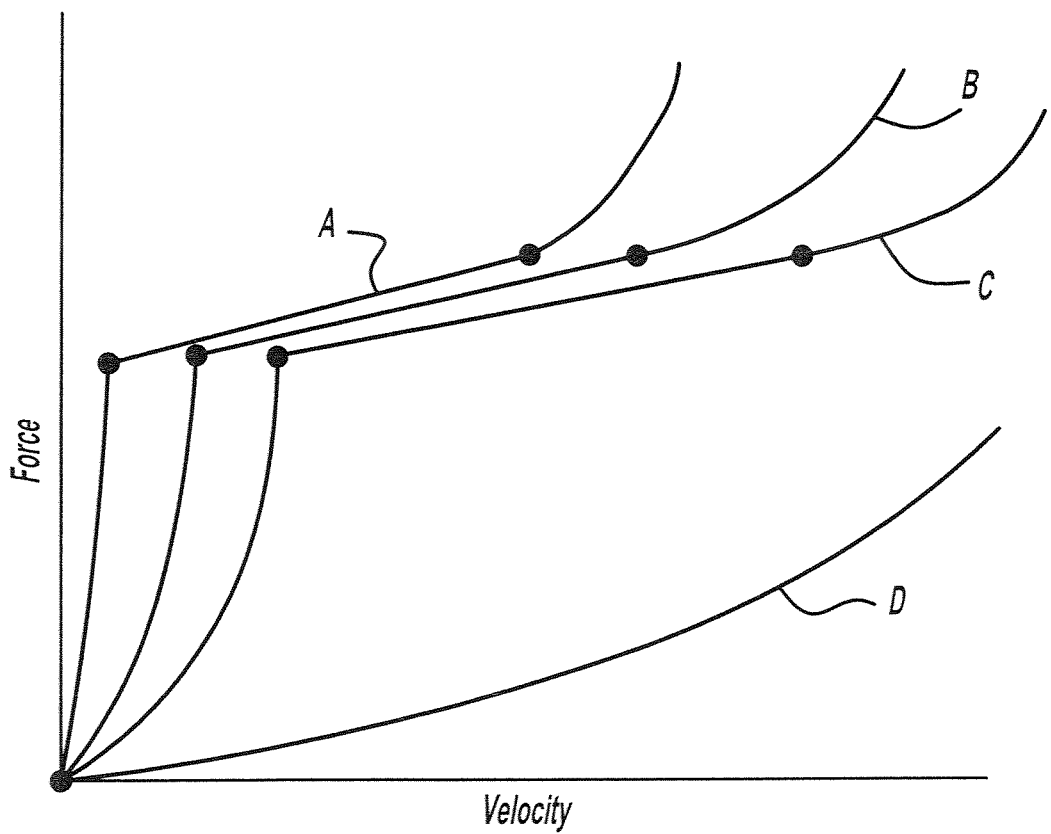
FIG. 7 is a graph of force vs. velocity for the shock absorber illustrated in FIGS. 2-6.

FIG. 7 discloses a force vs. velocity curve for shock absorber 20. Line A represents the bleed flow and the firm setting when digital valve assembly 126 is closed. Line B represents the bleed flow and the combination of the passive valving in piston assembly 32 or base valve assembly 38 in combination with a first opening degree of digital valve assembly 126. Line C represents the bleed flow and the combination of the passive valving in piston assembly 32 or base valve assembly 38 in combination with a second opening degree of digital valve assembly 126 greater than the first opening degree. Line D represents the bleed flow and the combination of the passive valving in piston assembly 32 or base valve assembly 38 in combination with a fully opened digital valve assembly 126.

Fluid will flow through digital valve assembly 126 will occur both during a rebound or extension stroke and during a compression stroke. During a rebound or extension stroke, fluid in upper working chamber 44 is pressurized which then forces fluid flow through digital valve assembly 126 when it is opened. During a compression stroke, fluid flows from lower working chamber 46 to upper working chamber 44 through piston assembly 32 due to the "rod volume" concept. When digital valve assembly 126 is opened, an open flow path between upper working chamber 44 and reservoir chamber 52 is created. Additional fluid flow will flow through piston assembly 32 and through digital valve assembly 126 because this open flow path creates the path of least resistance to reservoir chamber 52 in comparison to flow through base valve assembly 38.

Figure 8:
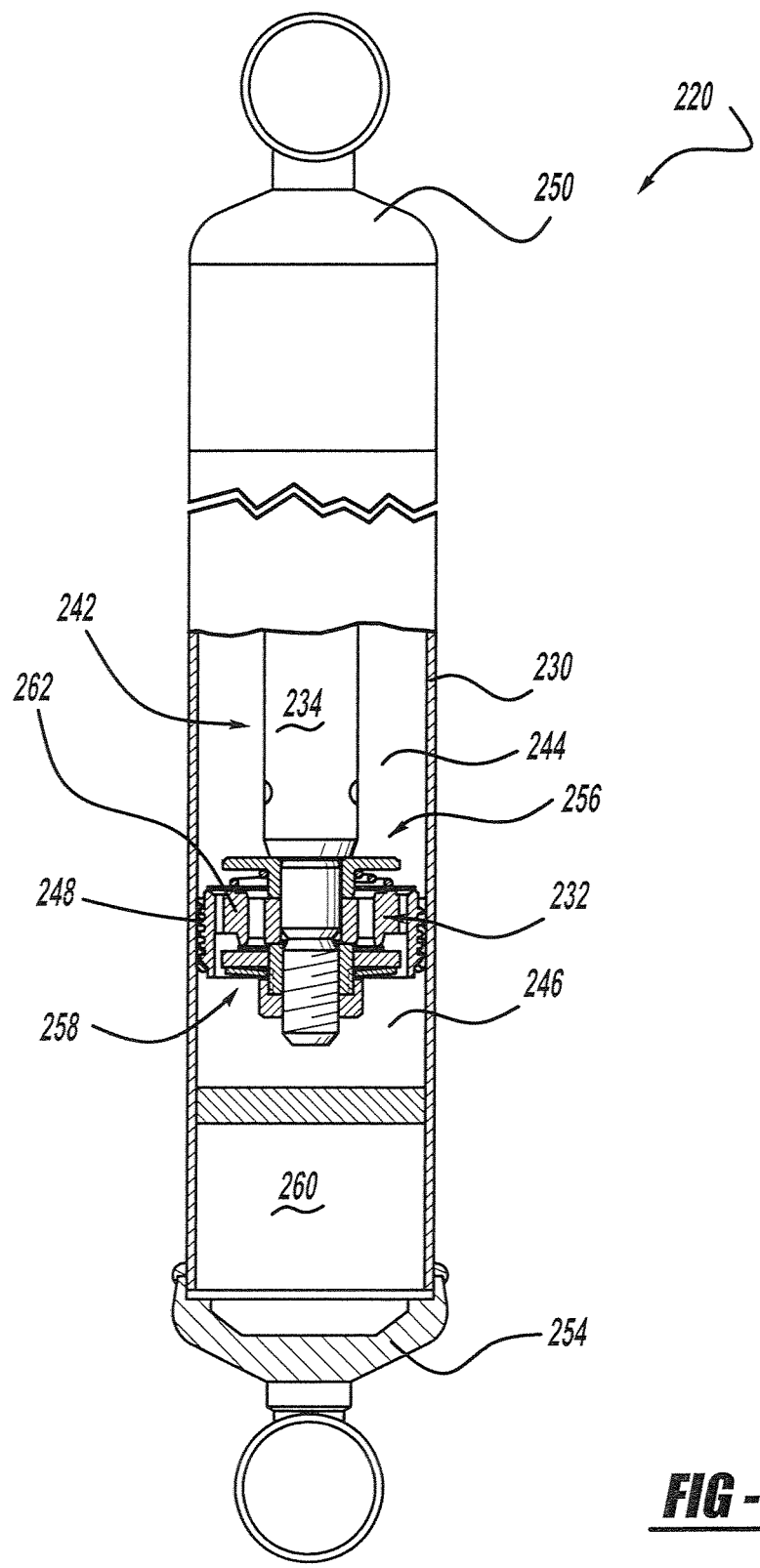
FIG. 8 is a side view, partially in cross-section, of a mono-tube shock absorber which incorporates the valve design in accordance with the present disclosure.
Figure 9:
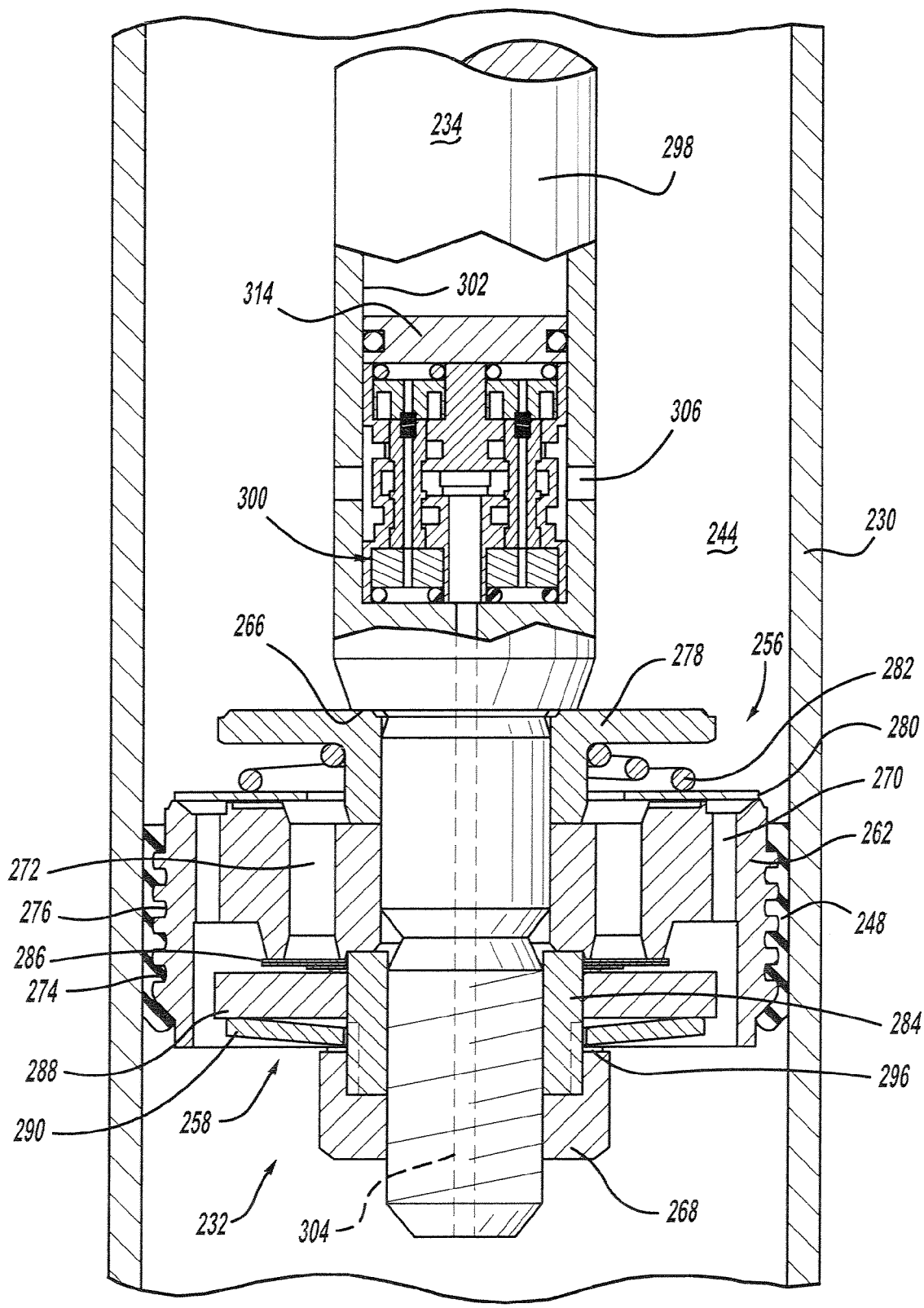
FIG. 9 is an enlarged side view, partially in cross-section of the piston assembly shown in FIG. 8.
Figure 10:
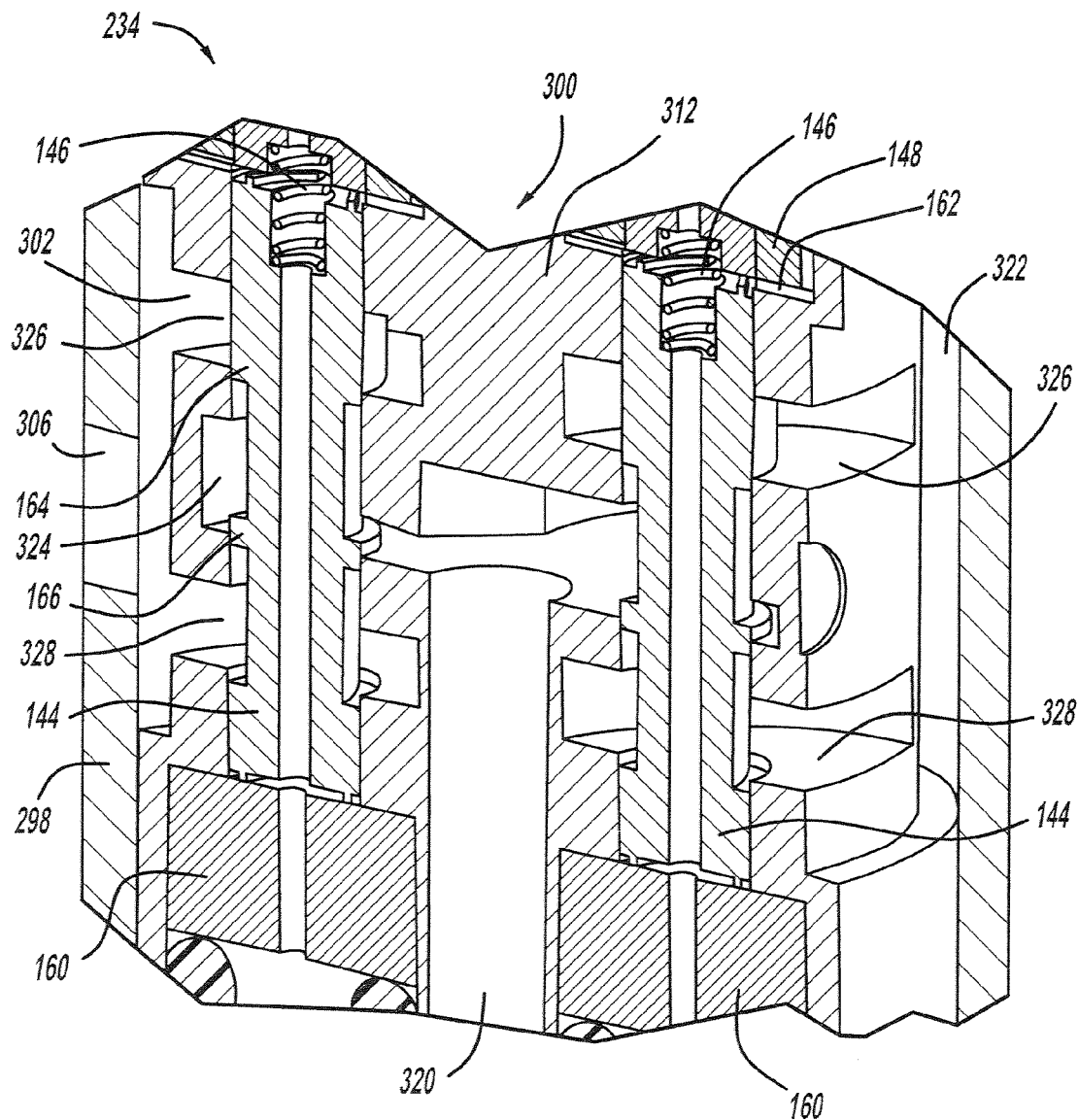
FIG. 10 is an enlarged cross-sectional perspective view of the digital valve assembly illustrated in FIGS. 8 and 9.

Referring now to FIG. 8-10, a mono-tube shock absorber 220 in accordance with the present invention is illustrated. Shock absorber 220 can replace either shock absorber 20 or shock absorber 26 by modifying the way it is adapted to be connected to the sprung mass and/or the unsprung mass of the vehicle. Shock absorber 220 comprises a pressure tube 230, a piston assembly 232 and a piston rod assembly 234.

Pressure tube 230 defines a working chamber 242. Piston assembly 232 is slidably disposed within pressure tube 230 and divides working chamber 242 into an upper working chamber 244 and a lower working chamber 246. A seal 248 is disposed between piston assembly 232 and pressure tube 230 to permit sliding movement of piston assembly 232 with respect to pressure tube 230 without generating undue frictional forces as well as sealing upper working chamber 244 from lower working chamber 246. Piston rod assembly 234 is attached to piston assembly 232 and it extends through upper working chamber 244 and through an upper end cap or rod guide 250 which closes the upper end of pressure tube 230. A sealing system seals the interface between rod guide 250, pressure tube 230 and piston rod assembly 234. The end of piston rod assembly 234 opposite to piston assembly 232 is adapted to be secured to the sprung mass of vehicle 10. The end of pressure tube 230 opposite to rod guide 250 is closed by a base cup 254 which is adapted to be connected to the unsprung mass of vehicle 10.

A compression valve assembly 256 associated with piston assembly 232 is termed a passive valve assembly which controls movement of fluid between lower working chamber 246 and upper working chamber 244 during compression movement of piston assembly 232 within pressure tube 230. The design for compression valve assembly 256 controls in part the damping characteristics for shock absorber 220 during a compression stroke. An extension valve assembly 258 associated with piston assembly 232 is termed a pressure valve assembly which controls movement of fluid between upper working chamber 244 and lower working chamber 246 during extension or rebound movement of piston assembly 232 within pressure tube 230. The design for extension valve assembly 258 controls in part the damping characteristics for shock absorber 220 during an extension or rebound stroke.

Because piston rod assembly 234 extends only through upper working chamber 244 and not lower working chamber 246, movement of piston assembly 232 with respect to pressure tube 230 causes a difference in the amount of fluid displaced in upper working chamber 244 and the amount of fluid displaced in lower working chamber 246. The difference in the amount of fluid displaced is known as the "rod volume" and compensation for this fluid is accommodated by a piston slidably disposed within pressure tube 230 and located between lower working chamber 246 and a compensation chamber 260. Typically compensation chamber 260 is filled with a pressurized gas and the piston moves within pressure tube 230 to compensate for the "rod volume" concept.

Referring now to FIG. 9, piston assembly 232 comprises a piston body 262, compression valve assembly 256 and extension valve assembly 258. Compression valve assembly 256 is assembled against a shoulder 266 on piston rod assembly 234. Piston body 262 is assembled against compression valve assembly 256 and extension valve assembly 258 is assembled against piston body 262. A nut 268 secures these components to piston rod assembly 234.

Piston body 262 defines a plurality of compression passages 270 and a plurality of rebound passages 272. Seal 248 includes a plurality of ribs 274 which mate with a plurality of annular grooves 276 to retain seal 248 during sliding movement of piston assembly 232.

Compression valve assembly 256 is termed a passive valve assembly which comprises a retainer 278, a valve disc 280 and a spring 282. Retainer 278 abuts shoulder 266 on one end and piston body 262 on the other end. Valve disc 280 abuts piston body 262 and closes compression passages 270 while leaving rebound passages 272 open. Spring 282 is disposed between retainer 278 and valve disc 280 to bias valve disc 280 against piston body 262. During a compression stroke, fluid in lower working chamber 246 is pressurized causing fluid pressure to react against valve disc 280. Prior to the opening of valve disc 280, a bleed flow of fluid will flow through a bleed passage defined by valve disc 280 and piston body 262. When the fluid pressure against valve disc 280 overcomes the biasing load of spring 282, valve disc 280 separates from piston body 262 to open compression passages 270 and allow fluid flow from lower working chamber 246 to upper working chamber 244. The damping characteristics for shock absorber 220 during a compression stroke are controlled by compression valve assembly 256. During a rebound stroke, compression passages 270 are closed by valve disc 280.

Extension valve assembly 258 is termed a passive valve assembly which comprises a spacer 284, a plurality of valve discs 286, a retainer 288 and a spring 290. Spacer 284 is threadingly received on piston rod assembly 234 and is disposed between piston body 262 and nut 268. Spacer 284 retains piston body 262 and compression valve assembly 256 while permitting the tightening of nut 268 without compressing either valve disc 280 or valve discs 286. Retainer 278, piston body 262 and spacer 284 provide a continuous solid connection between shoulder 266 and nut 268 to facilitate the tightening and securing of nut 268 to spacer 284 and thus to piston rod assembly 234. Valve discs 286 are slidingly received on spacer 284 and abut piston body 262 to close rebound passages 272 while leaving compression passages 270 open. Retainer 288 is also slidingly received on spacer 284 and it abuts valve discs 286. Spring 290 is assembled over spacer 284 and is disposed between retainer 288 and nut 268 which is threadingly received on spacer 284. Spring 290 biases retainer 288 against valve discs 286 and valve discs 286 against piston body 262. When fluid pressure is applied to valve discs 286, they will elastically deflect at the outer peripheral edge to open extension valve assembly 258. A shim 296 is located between nut 268 and spring 290 to control the preload for spring 290 and thus the blow off pressure as described below. Thus, the calibration for the blow off feature of extension valve assembly 258 is separate from the calibration for compression valve assembly 256.

During a rebound stroke, fluid in upper working chamber 244 is pressurized causing fluid pressure to react against valve discs 286. Prior to the deflection of valve discs 286, a bleed flow of fluid will flow through a bleed passage defined by valve discs 286 and piston body 262. When the fluid pressure reacting against valve discs 286 overcomes the bending load for valve discs 286, valve discs 286 elastically deflect opening rebound passages 272 allowing fluid flow from upper working chamber 244 to lower working chamber 246. The strength of valve discs 286 and the size of rebound passages will determine the damping characteristics for shock absorber 220 in rebound. When the fluid pressure within upper working chamber 244 reaches a predetermined level, the fluid pressure will overcome the biasing load of spring 290 causing axial movement of retainer 288 and the plurality of valve discs 286. The axial movement of retainer 288 and valve discs 286 fully opens rebound passages 272 thus allowing the passage of a significant amount of damping fluid creating a blowing off of the fluid pressure which is required to prevent damage to shock absorber 220 and/or vehicle 10.

Referring now to FIG. 10, piston rod assembly 234 is illustrated in greater detail. Piston rod assembly 234 comprises a piston rod 298 and a digital valve assembly 300. Piston rod 298 is a hollow piston rod that defines an internal bore 302 within which digital valve assembly 300 is located. An inlet passage 304 extends through the lower post portion of piston rod 298 to allow communication between lower working chamber 246 and internal bore 302. One or more outlet passages 306 extend through piston rod 298 to allow communication between upper working chamber 244 and internal bore 302.

Digital valve assembly 300 is a two position valve assembly which has a different flow area in each of the two positions. Digital valve assembly 300 comprises a sleeve 312, a plurality of spools 144, a plurality of springs 146, a plurality of coil assemblies 148 and a circuit board 314. Sleeve 312 defines a valve inlet 320 which is in communication with lower working chamber 246 through inlet passage 304; a valve outlet 322 which is in communication with upper working chamber 244 through outlet passages 306; a plurality of annular inlet chambers 324 each of which is in communication valve inlet 320; and a pair of annular outlet chamber 326, 328 associated with each inlet chamber 324 and each of which is in communication with valve outlet 322.

Each spool 144 is slidingly received within sleeve 312 and axially travels within sleeve 312 between a respective coil assembly 148 and a respective stop puck 160 disposed within sleeve 312. Each spring 146 biases a respective spool 144 away from coil assembly 148 and towards stop puck 160. A respective shim 162 is disposed between each coil assembly 148 and each spool 144 to control the amount of axial motion for spool 144. A first O-ring seals the interface between stop puck 160, sleeve 142 and piston rod 298. A second O-ring seals the interface between coil assembly 148, sleeve 142 and circuit board 314.

Spool 144 defines first flange 164 which controls fluid flow between a respective annular inlet chamber 324 and a respective annular outlet chamber 326 and second flange 166 that controls fluid flow between the respective annular inlet chamber 324 and a respective annular outlet chamber 328. Flanges 164 and 166 thus control fluid flow between upper working chamber 244 and lower working chamber 246.

Each coil assembly 148 is disposed within sleeve 312 to control the axial movement of a respective spool 144. The wiring connections for coil assemblies 148 extend to circuit board 314 and then through internal bore 302 of piston rod 298. Circuit board 314 is disposed in internal bore 302 immediately above sleeve 312. An O-ring seals the interface between circuit board 314 and piston rod 298. While circuit board 314 is illustrated as being in internal bore 302, it is within the scope of the present disclosure to locate circuit board 314 external to shock absorber 220. When there is no power provided to coil assemblies 148, the damping characteristics will be defined by the flow area of each digital valve assembly 300 in its first position and piston assembly 232. The movement of each spool 144 is controlled by supplying power provided to each coil assembly 148 to move the respective digital valve assembly to its second position. Digital valve assemblies 300 can be kept in the second position by continuing to supply power to each coil assembly 148 or by providing means for retaining digital valve assemblies 300 in the second position and discontinuing the supply of power to each coil assembly 148. The means for retaining each digital valve assembly 300 in its second position can include mechanical means, magnetic means or other means known in the art. Once in its second position, movement to the first position can be accomplished by terminating power to each coil assembly 148 or by reversing the current or reversing the polarity of the power supplied to each coil assembly 148 to overcome the retaining means. The amount of flow through each digital valve assembly 300 has discrete settings for flow control in both the first position and the second position. While the present disclosure is described using multiple digital valve assemblies 300, it is within the scope of the disclosure to use one digital valve assembly 300. When multiple digital valve assemblies 300 are used, the total flow area through the plurality of digital valve assemblies 300 can be set at a specific number of total flow areas depending on the position of each individual digital valve assemblies 300. The specific number of total flow areas can be defined as being $2^n$ flow areas where n is the number of digital valve assemblies 300. For example, if four digital valve assemblies 300, the number of total flow areas available would be $2^4$ or sixteen flow areas.

The force vs. velocity curve for shock absorber 20 illustrated in FIG. 7 is applicable to shock absorber 220. The curves A, B, C and D illustrated in FIG. 7 are achieved using digital valve assembly 300.

Figure 11:
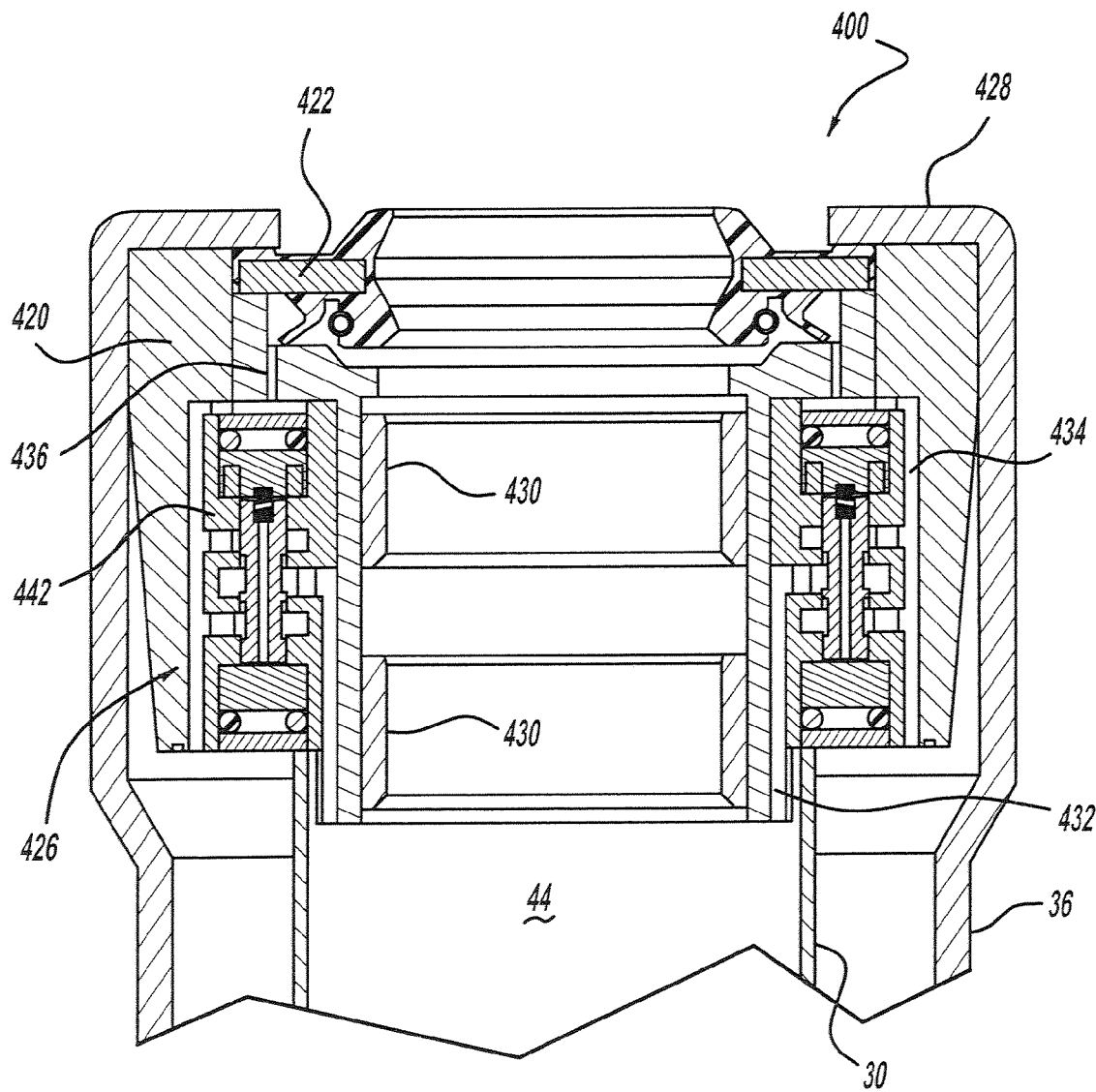
FIG. 11 is an enlarged cross-sectional view of a shock absorber and rod guide assembly in accordance with another embodiment of the present disclosure.
Figure 12:
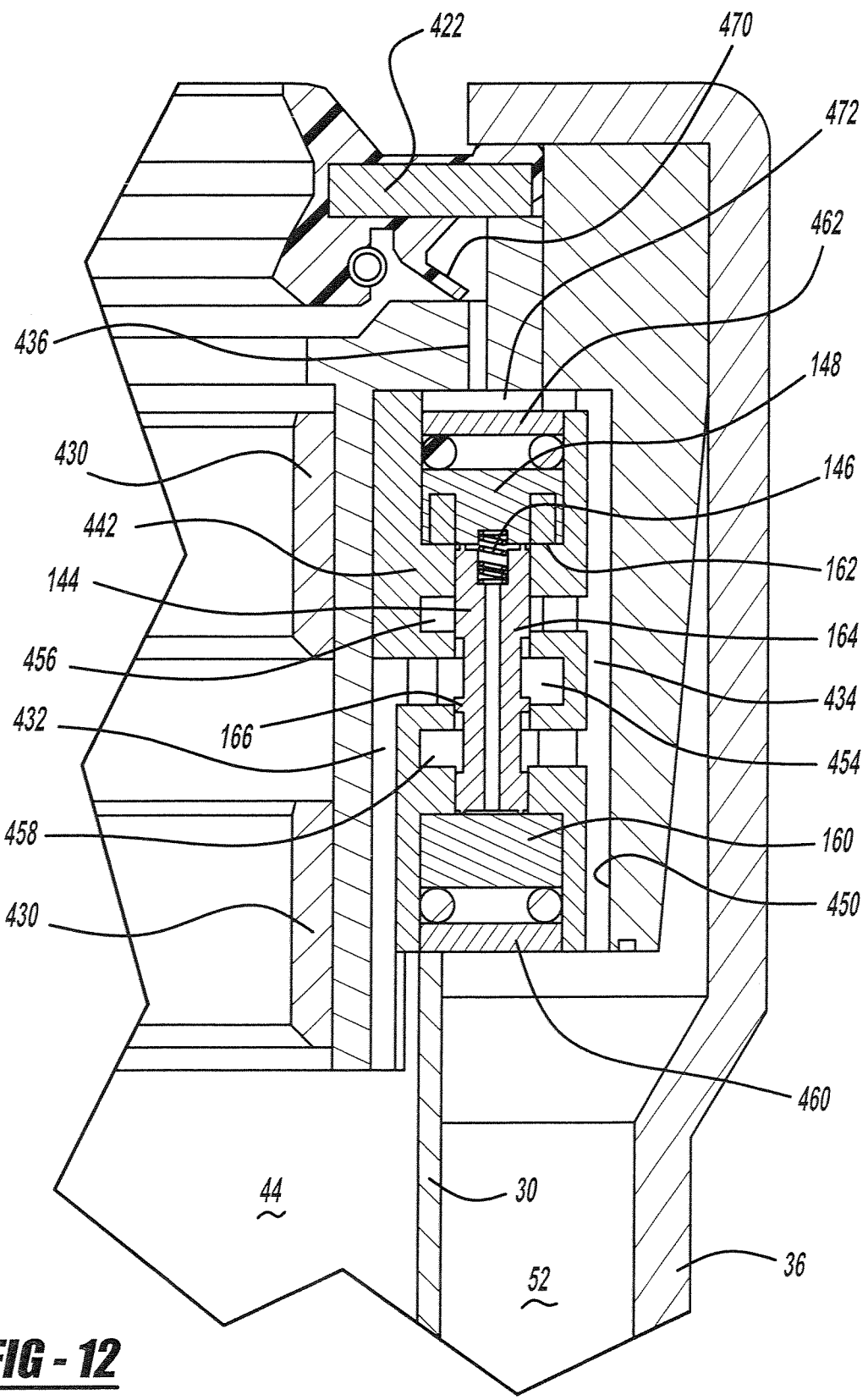
FIG. 12 is an enlarged cross-sectional view of the digital valve assembly illustrated in FIG. 11.

Referring now to FIGS. 11-12, a rod guide assembly 400 in accordance with the present disclosure is illustrated. Rod guide assembly 400 can be used in place of rod guide assembly 50. Rod guide assembly 400 comprises a rod guide housing 420, a seal assembly 422, and a plurality of digital valve assemblies 426.

Rod guide housing 420 is assembled into pressure tube 30 and into reserve tube 36. Seal assembly 422 is assembled to rod guide housing 420 and reserve tube 36 is rolled or formed over as illustrated at 428 to retain rod guide assembly 400. One or more bushings 430 assembled into rod guide housing 420 accommodates for the sliding motion of piston rod 34 while also providing for a seal for piston rod 34. A fluid passage 432 extends through rod guide housing 420 to allow fluid communication between upper working chamber 44 and digital valve assembly 426 as discussed below. A fluid passage 434 extends through rod guide housing 420 to allow fluid communication between digital valve assembly 426 and reservoir chamber 52. A plurality of seal ports 436 extend through rod guide housing 420 to accommodate the flow of fluid between piston rod 34 and bushings 430.

Each digital valve assembly 426 is identical and thus only one digital valve assembly 426 will be described. It is to be understood that the description below applies to all digital valve assemblies used in rod guide assembly 400. Digital valve assembly 426 is a two position valve assembly which has a different flow area in each of the two positions. Digital valve assembly 426 comprises a sleeve 442, spool 144, spring 146 and coil assembly 148. Sleeve 442 is disposed within a valve port 450 defined by rod guide housing 420. Sleeve 442 defines an annular inlet chamber 454 which is in communication with fluid passage 432 and a pair of annular outlet chambers 456 and 458 which are in communication with fluid passage 434.

Spool 144 is slidingly received within sleeve 442 and axially travels within sleeve 442 between coil assembly 148 and stop puck 160 disposed within sleeve 442. Spring 146 biases spool 144 away from coil assembly 148 and towards stop puck 160. Shim 162 is disposed between coil assembly 148 and spool 144 to control the amount of axial motion for spool 144. A first O-ring seals the interface between stop puck 160 and a retainer 460 secured to sleeve 442. A second O-ring seals the interface between coil assembly 148 and a retainer 462 secured to sleeve 442.

Spool 144 defines first flange 164 which controls fluid flow between annular inlet chamber 454 and annular outlet chamber 456 and second flange 166 that controls fluid flow between annular inlet chamber 454 and annular outlet chamber 458. Flanges 164 and 166 thus control fluid flow from upper working chamber 44 to reservoir chamber 52.

Coil assembly 148 is disposed within sleeve 442 to control the axial movement of spool 144. The wiring connections for coil assembly 148 can extend through rod guide housing 420, through sleeve 442 and/or through reserve tube 36. When there is no power provided to coil assembly 148, the damping characteristics will be defined by the flow area of digital valve assembly 426 in its first position, piston assembly 32 and base valve assembly 38. The movement of spool 144 is controlled by supplying power to coil assembly 148 to move digital valve assembly to its second position. Digital valve assembly 426 can be kept in its second position by continuing to supply power to coil assembly 148 or by providing means for retaining digital valve assembly 426 in its second position and discontinuing the supply of power to coil assembly 148. The means for retaining digital valve assembly 426 in its second position can include mechanical means, magnetic means or other means known in the art. Once in its second position, movement to the first position can be accomplished by terminating power to coil assembly 148 or by reversing the current or reversing the polarity of the power supplied to coil assembly 148 to overcome the retaining means. The amount of flow through digital valve assembly 426 has discrete settings for flow control in both the first position and the second position. While the present disclosure is described using a plurality of digital valve assemblies 426, it is within the scope of the disclosure to use a single digital valve assembly 426. Similar to rod guide assembly 50, digital valve assemblies 426 control damping loads in both extension and compression strokes for shock absorber 20. When multiple digital valve assemblies 426 are used, the total flow area through the plurality of digital valve assemblies 426 can be set at a specific number of total flow areas depending on the position of each individual digital valve assemblies 426. The specific number of total flow areas can be defined as being $2^n$ flow areas where n is the number of digital valve assemblies 426. For example, if four digital valve assemblies 426, the number of total flow areas available would be $2^4$ or sixteen flow areas.

The force vs. velocity curve for shock absorber 20 illustrated in FIG. 7 is applicable to shock absorber 20 when it incorporates rod guide assembly 400 in place of rod guide assembly 50. The curves A, B, C and D illustrated in FIG. 7 are achieved using digital valve assemblies 426.

Seal assembly 422 includes a check seal 470 which allows fluid to flow from the interface between piston rod 34 and bushings 430 to reservoir chamber 52 through seal ports 436 and fluid passage 434 but prohibit fluid flow from reservoir chamber 52 or fluid passage 434 through seal ports 436 to the interface between piston rod 34 and bushings 430. The upper portion of sleeve 442, above retainer 462 defines a flow passage 472 to allow fluid flow from seal ports 436 to reach fluid passage 434 and thus reservoir chamber 52.

Referring now to FIGS. 13 and 14, a piston rod assembly 500 in accordance with the present disclosure is illustrated. Piston rod assembly 500 can be used in place of piston rod assembly 234. Piston rod assembly 500 comprises a piston rod 508 and a plurality of digital valve assemblies 510. Piston rod 508 is a hollow piston rod that defines an internal bore 512 within which the plurality of digital valve assemblies 510 are located. An inlet passage 514 extends through the lower post portion of piston rod 508 to allow communication between lower working chamber 246 and internal bore 512. One or more outlet passages 516 extend through piston rod 508 to allow communication between upper working chamber 244 and internal bore 512.

As illustrated in FIG. 13, the plurality of digital valve assemblies 510 are stacked atop each other within internal bore 512. Each digital valve assembly 510 is identical and thus, only one digital valve assembly will be described. It is to be understood that the description below applies to all digital valve assemblies 510 used in piston rod assembly 500.

Digital valve assembly 510 is a two position valve assembly which has a different flow area in each of the two positions. Digital valve assembly 510 comprises a sleeve 522, spool 144, spring 146 and coil assembly 148. A single circuit board 524 is utilized for the plurality of digital valve assemblies 510. Sleeve 522 defines a valve inlet 530 which is in communication with lower working chamber 246 through inlet passage 514; a valve outlet 532 which is in communication with upper working chamber 244 through outlet passages 516; an annular inlet chamber 534 each of which is in communication valve inlet 530; and a pair of annular outlet chamber 536, 538 associated with inlet chamber 534 and each of which is in communication with valve outlet 532.

Each spool 144 is slidingly received within sleeve 522 and axially travels within sleeve 522 between coil assembly 148 and stop puck 160 disposed within sleeve 522. Spring 146 biases spool 144 away from coil assembly 148 and towards stop puck 160. Shim 162 is disposed between coil assembly 148 and sleeve 522 to control the amount of axial motion for spool 144. A first O-ring seals the interface between stop puck 160 and a washer 540 attached to sleeve 522. A second O-ring seals the interface between coil assembly 148 and a washer 542 attached to sleeve 522.

Spool 144 defines first flange 164 which controls fluid flow between annular inlet chamber 534 and annular outlet chamber 536 and second flange 166 that controls fluid flow between annular inlet chamber 534 and annular outlet chamber 538. Flanges 164 and 166 thus control fluid flow between upper working chamber 244 and lower working chamber 246.

Coil assembly 148 is disposed within sleeve 522 to control the axial movement of spool 144. The wiring connections for coil assembly 148 extend to circuit board 524 and then through internal bore 512 of piston rod 508. Circuit board 524 is disposed in internal bore 302 immediately above the plurality of digital valve assemblies 510. An O-ring seals the interface between circuit board 524 and piston rod 508. While circuit board 524 is illustrated as being in internal bore 512, it is within the scope of the present disclosure to locate circuit board 524 external to shock absorber 220.

When there is no power provided to coil assemblies 148, the damping characteristics will be defined by the flow area of digital valve assemblies 510 in the first position and piston assembly 232. The movement of each spool 144 is controlled by supplying power to each coil assembly 148 to move digital valve assemblies 510 to the second position. Digital valve assemblies 510 can be kept in the second position by continuing to supply power to each coil assembly 148 or by providing means for retaining digital valve assemblies 510 in the second position and discontinuing the supply of power to coil assemblies 148. The means for retaining digital valve assemblies 510 in the second position can include mechanical means, magnetic means or other means known in the art. Once in the second position, movement to the first position can be accomplished by terminating power to each coil assembly 148 or by reversing the current or reversing the polarity of the power supplied to each coil assembly 148 to overcome the retaining means. The amount of flow through each digital valve assembly 510 has discrete settings for flow control in both the first position and the second position. While the present disclosure is described using multiple digital valve assemblies 510, it is within the scope of the disclosure to use one digital valve assembly 510. When multiple digital valve assemblies 510 are used, the total flow area through the plurality of digital valve assemblies 510 can be set at a specific number of total flow areas depending on the position of each individual digital valve assemblies 510. The specific number of total flow areas can be defined as being $2^n$ flow areas where n is the number of digital valve assemblies 510. For example, if four digital valve assemblies 510, the number of total flow areas available would be $2^4$ or sixteen flow areas.

The force vs. velocity curve for shock absorber 20 illustrated in FIG. 7 is applicable to shock absorber 220 in cooperation with the plurality of digital valve assemblies 510. The curves A, B, C and D illustrated in FIG. 7 are achieved using digital valve assemblies 510.

Figure 15:
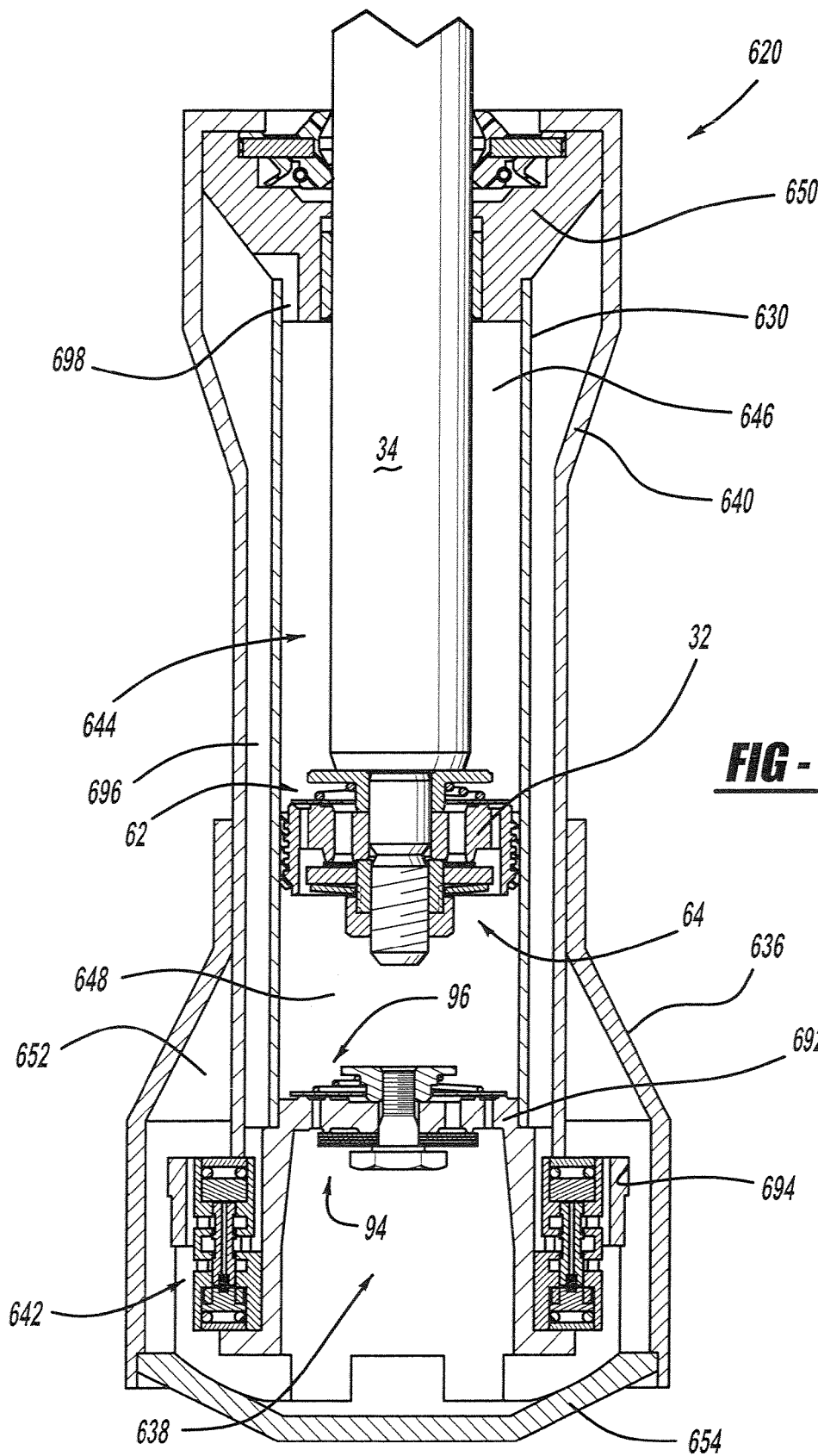
FIG. 15 is a cross-sectional side view of a shock absorber assembly in accordance with another embodiment of the present disclosure.
Figure 16:
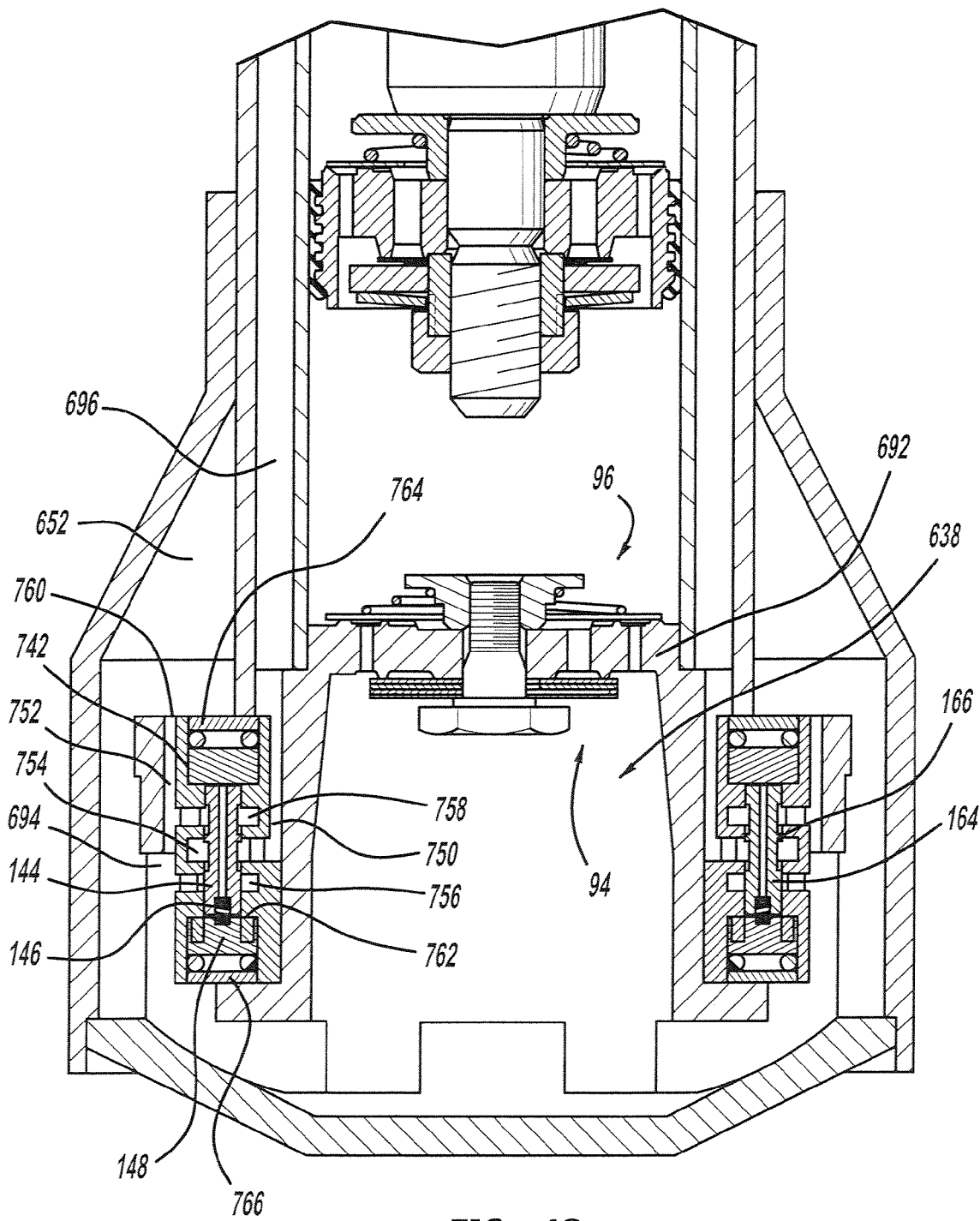
FIG. 16 is an enlarged cross-sectional view of the digital valve assemblies illustrated in FIG. 15.

Referring now to FIGS. 15 and 16, a shock absorber 620 in accordance with another embodiment of the present disclosure is illustrated. Shock absorber 620 can replace shock absorber 20 or 220. Shock absorber 620 comprises a pressure tube 630, piston assembly 32, piston rod 34, a reserve tube 636, a base valve assembly 638, an intermediate tube 640 and a plurality of digital valve assemblies 642. While shock absorber 620 is illustrated having a plurality of digital valve assemblies 642, it is within the scope of the present disclosure to utilize a single digital valve assembly 642.

Pressure tube 630 defines a working chamber 644. Piston assembly 32 is slidably disposed within pressure tube 630 and divides working chamber 644 into an upper working chamber 646 and a lower working chamber 648. A seal is disposed between piston assembly 32 and pressure tube 630 to permit sliding movement of piston assembly 32 with respect to pressure tube 630 without generating undue frictional forces as well as sealing upper working chamber 646 from lower working chamber 648. Piston rod 34 is attached to piston assembly 32 and extends through upper working chamber 646 and through an upper rod guide assembly 650 which closes the upper end of pressure tube 630. A sealing system seals the interface between upper rod guide assembly 650, reserve tube 636 and piston rod 34. The end of piston rod 34 opposite to piston assembly 32 is adapted to be secured to the sprung mass of vehicle 10. Because piston rod 34 extends only through upper working chamber 646 and not lower working chamber 648, extension and compression movements of piston assembly 32 with respect to pressure tube 630 causes a difference in the amount of fluid displaced in upper working chamber 646 and the amount of fluid displaced in lower working chamber 648. The difference in the amount of fluid displaced is known as the "rod volume" and during extension movements it flows through base valve assembly 638. During a compression movement of piston assembly 32 with respect to pressure tube 630, valving within piston assembly 32 allow fluid flow from lower working chamber 648 to upper working chamber 646 and the "rod volume" of fluid flow flows through digital valve assemblies 642 and/or fluid flow will flow through base valve assembly 638 as described below.

Reserve tube 636 surrounds pressure tube 630 to define a fluid reservoir chamber 652 located between tubes 640 and 636. The bottom end of reserve tube 636 is closed by a base cup 654 which, with the lower portion of shock absorber 620, is adapted to be connected to the unsprung mass of vehicle 10. The upper end of reserve tube 636 is attached to intermediate tube 640 but it could extend up to upper rod guide assembly 650. Base valve assembly 638 is disposed between lower working chamber 648 and reservoir chamber 652 to control the flow of fluid from reservoir chamber 652 to lower working chamber 648. When shock absorber 620 extends in length, an additional volume of fluid is needed in lower working chamber 648 due to the "rod volume" concept. Thus, fluid will flow from reservoir chamber 652 to lower working chamber 648 through base valve assembly 638 as detailed below. When shock absorber 620 compresses in length, an excess of fluid must be removed from lower working chamber 648 due to the "rod volume" concept. Thus, fluid will flow from lower working chamber 648 to reservoir chamber 652 through digital valve assemblies 642 and/or through base valve assembly 438 as detailed below.

Piston assembly 32 is described above for shock absorber 20 and the description of that embodiment applies here also.

Base valve assembly 638 is the same as base valve assembly 38 described above except that valve body 92 in base valve assembly 38 is replaced by valve body 692 for base valve assembly 638. Valve body 692 is the same as valve body 92 in relation to compression valve assembly 94 and rebound valve assembly 96. Valve body 692 is different from valve body 92 in that valve body 692 defines a plurality of cylinder end ports 694 each of which accepts a respective digital valve assembly 642 as described below.

Intermediate tube 640 engages upper rod guide assembly 650 on an upper end and it engages valve body 692 at its opposite end. An intermediate chamber 696 is defined between intermediate tube 640 and pressure tube 630. A passage 698 is formed in upper rod guide assembly 650 for fluidly connecting upper working chamber 646 and intermediate chamber 696.

Figure 17:
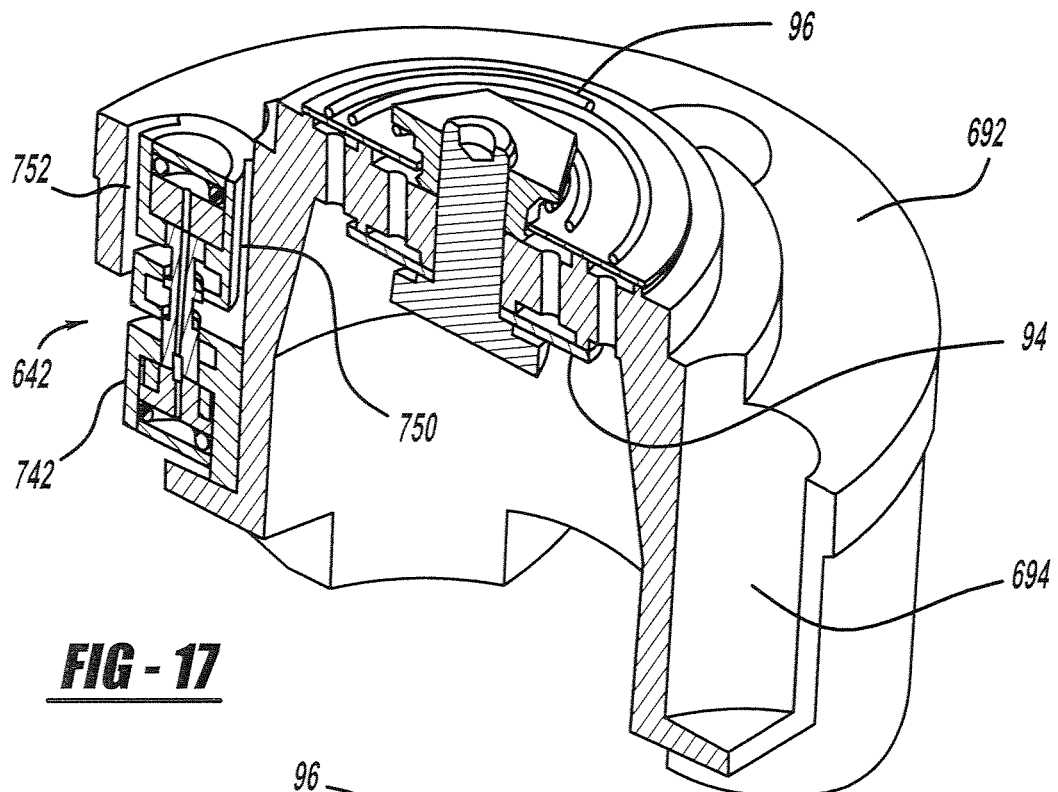
FIG. 17 is an enlarged cross-sectional perspective view of the base valve assembly illustrated in FIGS. 15 and 16.

Referring to FIGS. 16 and 17, the operation of shock absorber 620 will be described when digital valve assemblies 642 contribute to the damping characteristics for shock absorber 620. As discussed above, when no power is provided to digital valve assemblies 642, the damping characteristics are provided by piston assembly 32 during an extension stroke and base valve assembly 638 during a compression stroke. During a rebound or extension stroke, compression valve assembly 62 closes the plurality of compression passages 70 and fluid pressure within upper working chamber 646 increases. Fluid is forced from upper working chamber 646, through passage 698, into intermediate chamber 696 to reach digital valve assemblies 642.

During a compression stroke, compression valve assembly 62 will open to allow fluid flow from lower working chamber 648 to upper working chamber 646. Due to the "rod volume" concept, fluid in upper working chamber 646 will flow from upper working chamber 646, through passage 698, into intermediate chamber 696 to reach digital valve assemblies 642.

The plurality of digital valve assemblies 642 are the same and only one digital valve assembly 642 will be described. It is to be understood that the description below applies to all of digital valve assemblies 642. Digital valve assembly 642 is a two position valve assembly which has a different flow area in each of the two positions. Digital valve assembly 642 comprises a sleeve 742, spool 144, a spring 146 and coil assembly 148. Sleeve 742 defines a valve inlet 750 which is in communication with intermediate chamber 696 and a valve outlet 752 which is in fluid communication with reservoir chamber 652.

Sleeve 742 is disposed within cylinder end port 694 of valve body 692. Sleeve 742 defines an annular inlet chamber 754 which is in communication with valve inlet 750 and a pair of annular outlet chambers 756 and 758 which are in communication with valve outlet 752.

Spool 144 is slidingly received within sleeve 742 and axially travels within sleeve 742 between coil assembly 148 and a stop puck 760 disposed within sleeve 742. Spring 146 biases spool 144 away from coil assembly 148 and towards stop puck 760. A shim 762 is disposed between coil assembly 148 and sleeve 742 to control the amount of axial motion for spool 144. A first O-ring seals the interface between stop puck 760, sleeve 742 and a first retainer 764 attached to sleeve 742. A second O-ring seals the interface between coil assembly 148, sleeve 742 and a second retainer 766 attached to sleeve 742.

Spool 144 defines first flange 164 which controls fluid flow between annular inlet chamber 754 and annular outlet chamber 756 and second flange 166 that controls fluid flow between annular inlet chamber 754 and annular outlet chamber 758. Flanges 164 and 166 thus control fluid flow from intermediate chamber 696 to reservoir chamber 652.

Coil assembly 148 is disposed within sleeve 742 to control the axial movement of spool 144. The wiring connections for coil assembly 148 can extend through valve body 692, through sleeve 742, through base cup 654 and/or through reserve tube 636. When there is no power provided to coil assembly 148, the damping characteristics will be defined by the flow area of digital valve assembly 642 in its first position, piston assembly 32 and base valve assembly 638. The movement of spool 144 is controlled by supplying power to coil assembly 148 to move digital valve assembly 642 to its second position. Digital valve assembly 642 can be kept in its second position by continuing to supply power to coil assembly 148 or by providing means for retaining digital valve assembly 642 in its second position and discontinuing the supply of power to coil assembly 148. The means for retaining digital valve assembly 642 in its second position can include mechanical means, magnetic means or other means known in the art. Once in its second position, movement to the first position can be accomplished by terminating power to coil assembly 148 or by reversing the current or reversing the polarity of the power supplied to coil assembly 148 to overcome the retaining means. The amount of flow through digital valve assembly 642 has discrete settings for flow control in both the first position and the second position. While the present disclosure is described using multiple digital valve assemblies 642, it is within the scope of the disclosure to use one digital valve assembly 642. When multiple digital valve assemblies 642 are used, the total flow area through the plurality of digital valve assemblies 642 can be set at a specific number of total flow areas depending on the position of each individual digital valve assemblies 642. The specific number of total flow areas can be defined as being $2^n$ flow areas where n is the number of digital valve assemblies 642. For example, if four digital valve assemblies 642, the number of total flow areas available would be $2^4$ or sixteen flow areas.

The force vs. velocity curve for shock absorber 20 illustrated in FIG. 7 is applicable to shock absorber 620 in cooperation with the plurality of digital valve assemblies 642. The curves A, B, C and D illustrated in FIG. 7 are achieved using digital valve assemblies 642.

Figure 19:
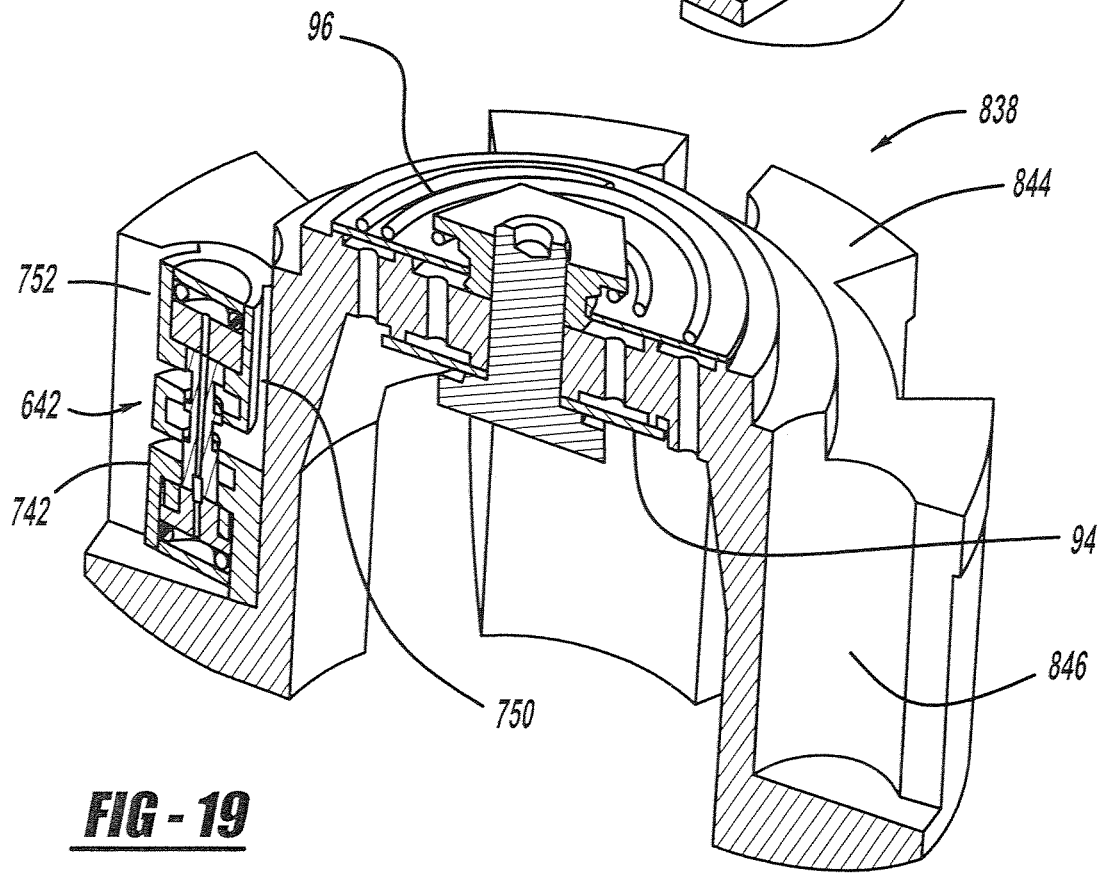
FIG. 19 is an enlarged cross-sectional perspective view of the base valve assembly illustrated in FIG. 18.
Figure 18:
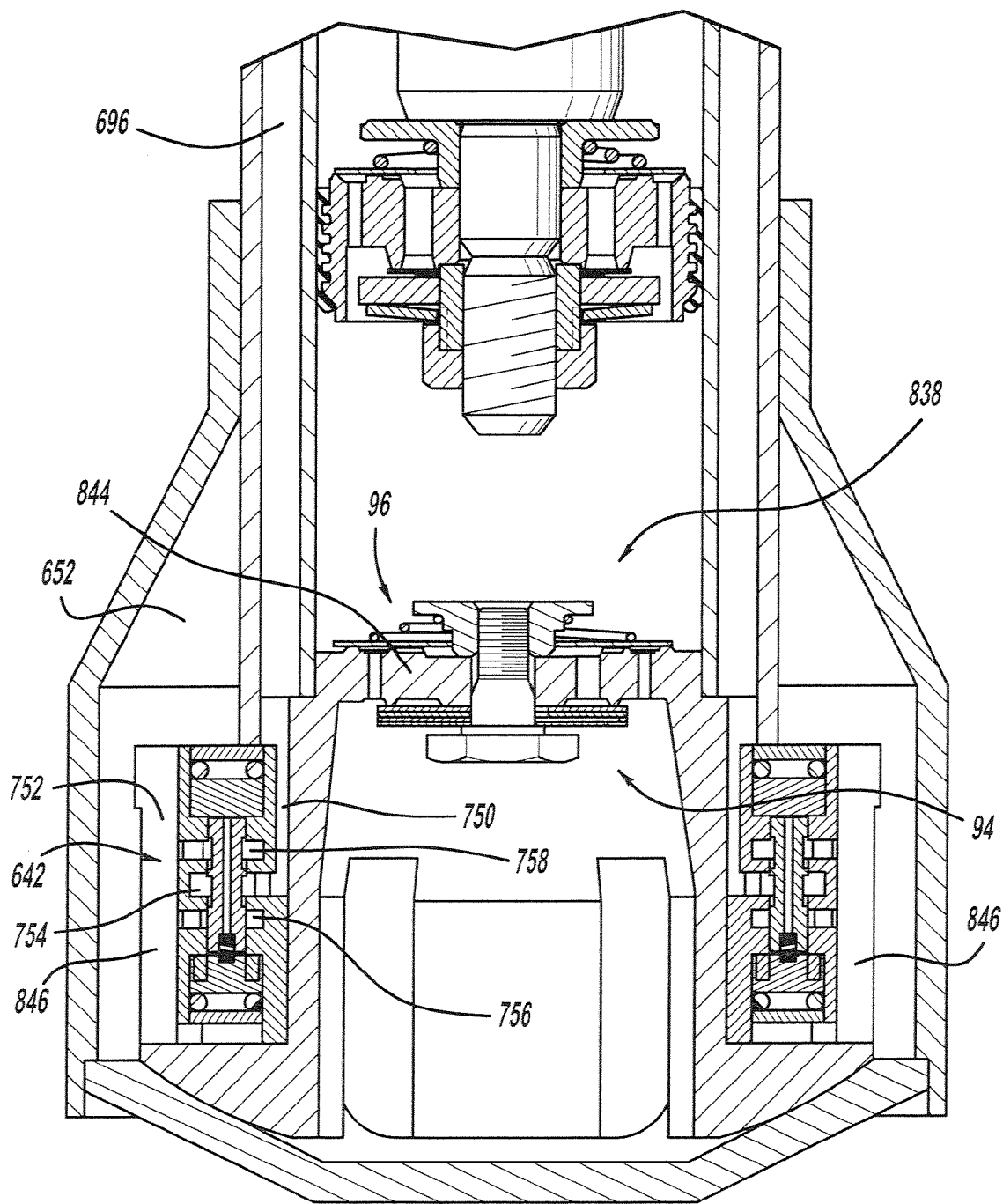
FIG. 18 is a cross-sectional view of a base valve assembly in accordance with another embodiment of the present disclosure.

Referring now to FIGS. 18 and 19, a base valve assembly 838 in accordance with another embodiment of the present disclosure is illustrated. Base valve assembly 838 is a replacement for base valve assembly 638. Base valve assembly 838 is the same as base valve assembly 838 except for valve body 692. Valve body 692 in base valve assembly 638 has been replaced with valve body 844 in base valve assembly 838. Valve body 844 defines a plurality of cylinder end ports 846 each of which accepts a respective digital valve assembly 642. The operation and function of base valve assembly 838 is the same as that described above for base valve assembly 638.

Figure 20:
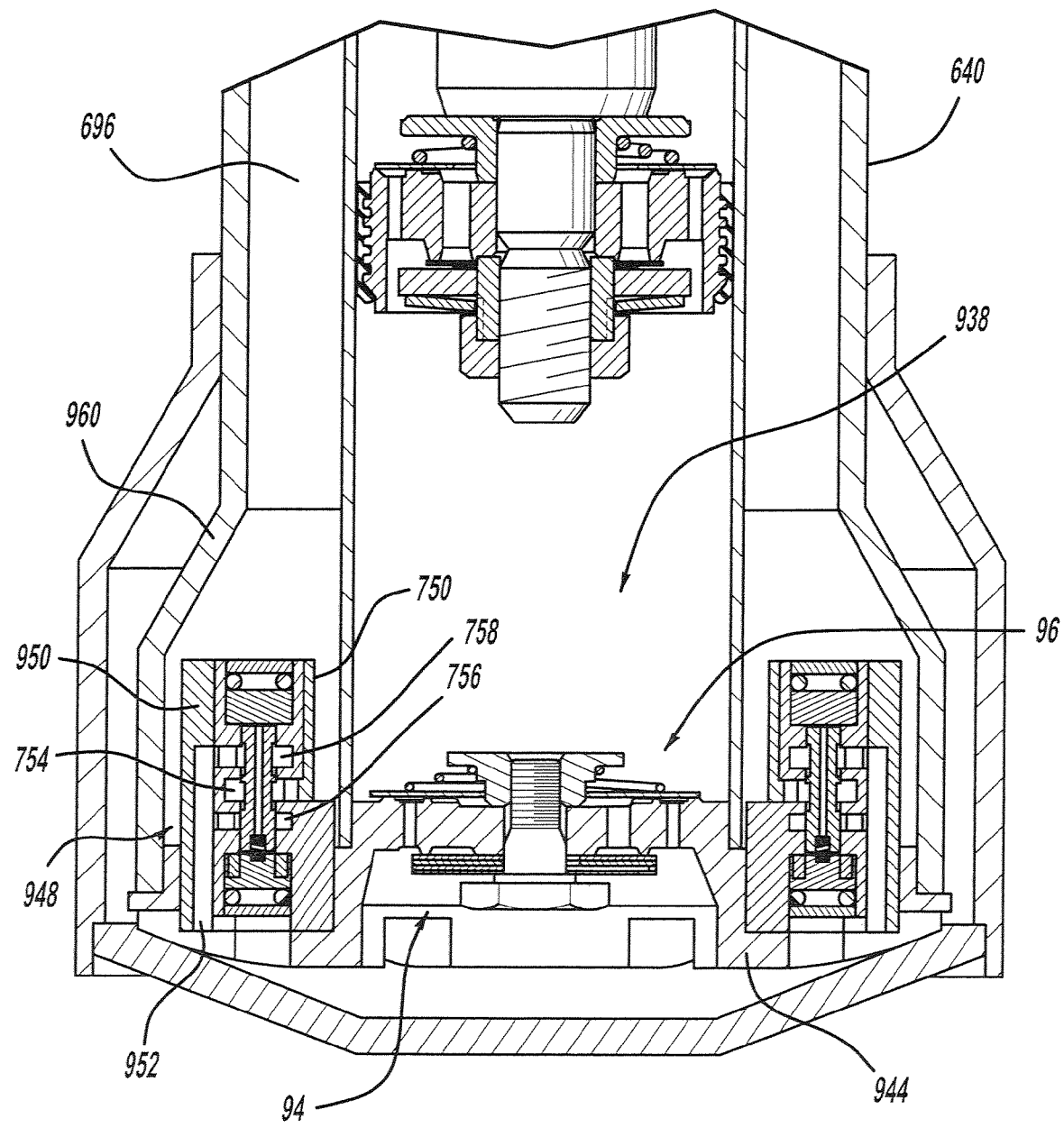
FIG. 20 is a cross-sectional view of a base valve assembly in accordance with another embodiment of the present disclosure.
Figure 21:
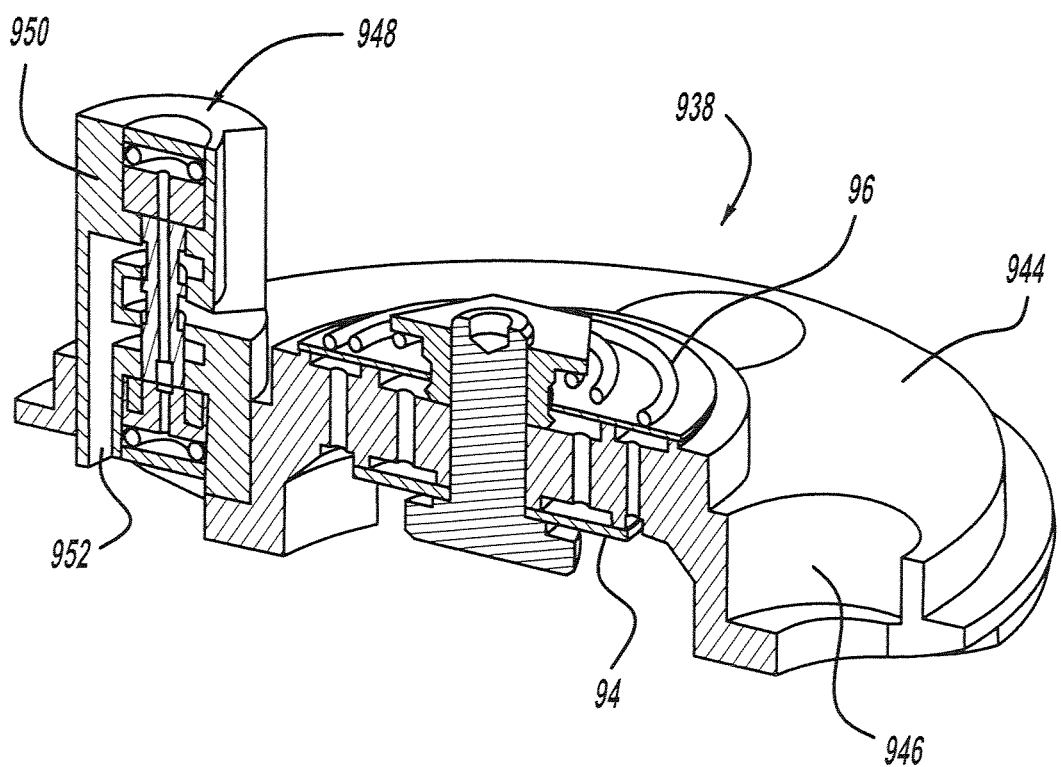
FIG. 21 is an enlarged cross-sectional perspective view of the base valve assembly illustrated in FIG. 20.

Referring now to FIGS. 20 and 21, a base valve assembly 938 in accordance with another embodiment of the present disclosure is illustrated. Base valve assembly 938 is a replacement for base valve assembly 638. Base valve assembly 938 is the same as base valve assembly 638 except for valve body 692 and digital valve assembly 642. Valve body 692 in base valve assembly 638 has been replaced with valve body 944 in base valve assembly 938 and digital valve assembly 642 has been replaced with a digital valve assembly 948. Valve body 944 defines a plurality of cylinder end ports 946 each of which accepts a respective digital valve assembly 948. Digital valve assembly 948 is the same as digital valve assembly 642 except that sleeve 742 is replaced by sleeve 950. Sleeve 950 is the same as sleeve 742 except that valve outlet 752 of sleeve 742 is replaced by valve outlet 952 of sleeve 950. Valve outlet 752 of sleeve 742 is open along the entire axial length of sleeve 742. Outlet 952 of sleeve 950 is open only at the bottom surface of sleeve 950.

Digital valve assembly 948 is disposed within intermediate chamber 696 as illustrated in FIG. 20. Intermediate tube 640 is enlarged as shown at 960 to accommodate digital valve assembly 948. The operation and function of base valve assembly 938 is the same as that described above for base valve assembly 638.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A shock absorber comprising:
a pressure tube forming a working chamber;
a piston assembly slidably disposed within said pressure tube, said piston assembly dividing said working chamber into an upper working chamber and a lower working chamber, said piston assembly including a piston body defining a first fluid passage extending through said piston body and a first valve assembly controlling fluid flow through said first fluid passage;
a piston rod assembly attached to said piston assembly;
a second fluid passage separate from said first fluid passage, said second fluid passage extending from one of said upper and lower working chambers to a fluid chamber; and
a digital valve assembly controlling fluid flow through said second fluid passage; wherein
fluid flow through said first valve assembly generates a high damping load for said shock absorber;
fluid flow through said first and digital valve assemblies generates a low damping load, lower than said high damping load, for said shock absorber;
said second fluid passage is defined by said piston rod assembly;
said digital valve assembly is disposed within said piston rod assembly;
said second fluid passage extends between said upper and lower working chambers;
the other of said upper and lower working chambers defines said fluid chamber;
said digital valve assembly includes a first member, a second member disposed within said first member to move in an axial direction within said first member and a third member configured to move said second member in the axial direction;
said digital valve assembly includes a single inlet, a first outlet and a second outlet separate from the first outlet; and
fluid flow from said single inlet to said first outlet is in a first direction parallel to said axial direction and fluid flow from said single inlet to said second outlet is in a second direction parallel to said axial direction, said second direction being opposite to said first direction.

2. The shock absorber according to claim 1, further comprising:
a third fluid passage extending through said piston body;
a second valve assembly controlling fluid flow through said third fluid passage.

3. The shock absorber according to claim 1, wherein said digital valve assembly includes a plurality of digital valves.

4. The shock absorber according to claim 3, wherein said plurality of digital valves are aligned in an axial direction of said piston rod assembly.

5. The shock absorber according to claim 1, further comprising a circuit board disposed within said piston rod assembly.

6. The shock absorber according to claim 1, wherein
said first member is a sleeve, and said single inlet is in communication with one of said upper and lower working chambers and said first and second outlets are in communication with the other of said upper and lower working chambers;
said second member is a spool movably disposed within said sleeve; and
said third member is a coil assembly disposed adjacent said spool.

7. The shock absorber according to claim 6, wherein said digital valve assembly includes a plurality of digital valves.

8. The shock absorber according to claim 1, wherein
said first member is a sleeve;
said second member is a spool movably disposed within said sleeve; and
said third member is a coil assembly disposed adjacent said spool.

9. A shock absorber comprising:
a pressure tube forming a working chamber;
a piston assembly slidably disposed within said pressure tube, said piston assembly dividing said working chamber into an upper working chamber and a lower working chamber, said piston assembly including a piston body defining a first fluid passage extending through said piston body and a valve assembly controlling fluid flow through said first fluid passage;
a tubular piston rod assembly attached to said piston assembly, and having an internal bore forming a second fluid passage at least partially therethrough, and an outlet passage to allow flow communication between the working chamber and the internal bore;
a digital valve assembly including at least one axially movable digital valve housed within said tubular piston rod for controlling fluid flow between said second fluid passage and said outlet passage, said digital valve having a first position blocking flow communication between said internal bore and said outlet passage, and a second position permitting flow between said internal bore and said outlet passage; wherein
said valve assembly and said digital valve assembly are selectively controlled to change a damping load of said shock absorber;
said digital valve assembly includes a first member, a second member disposed within said first member to move in an axial direction within said first member and a third member configured to move said second member in the axial direction;
said digital valve assembly includes a single inlet, a first outlet and a second outlet separate from the first outlet; and
fluid flow from said single inlet to said first outlet is in a first direction parallel to said axial direction and fluid flow from said single inlet to said second outlet is in a second direction parallel to said axial direction, said second direction being opposite to said first direction.

* * * * *